US008801167B2

(12) United States Patent
Katoh et al.

(10) Patent No.: US 8,801,167 B2
(45) Date of Patent: Aug. 12, 2014

(54) INKJET RECORDING APPARATUS, METHOD FOR INKJET RECORDING, AND INK

(75) Inventors: Keita Katoh, Shizuoka (JP); Ichiroh Fujii, Kanagawa (JP); Masaki Kudo, Shizuoka (JP); Tomohiro Nakagawa, Kanagawa (JP); Akihiko Gotoh, Kanagawa (JP); Koji Katsuragi, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 142 days.

(21) Appl. No.: 13/603,641

(22) Filed: Sep. 5, 2012

(65) Prior Publication Data

US 2013/0063524 A1 Mar. 14, 2013

(30) Foreign Application Priority Data

Sep. 8, 2011 (JP) .................... 2011-195728

(51) Int. Cl.
| | |
|---|---|
| *B41J 2/135* | (2006.01) |
| *B41J 2/16* | (2006.01) |
| *B41J 2/21* | (2006.01) |
| *B41J 2/14* | (2006.01) |
| *C08K 3/04* | (2006.01) |
| *C09D 11/10* | (2014.01) |
| *C09D 11/00* | (2014.01) |
| *C08K 9/06* | (2006.01) |

(52) U.S. Cl.
CPC *B41J 2/135* (2013.01); *B41J 2/162* (2013.01); *B41J 2/2107* (2013.01); *B41J 2/1433* (2013.01); *C08K 3/04* (2013.01); *C09D 11/10* (2013.01); *C09D 11/324* (2013.01); *C09D 11/322* (2013.01); *B41J 2/1606* (2013.01); *C08K 9/06* (2013.01)
USPC ................. 347/100; 347/95; 347/45

(58) Field of Classification Search
CPC ............ B41J 2/21; B41J 2/2107; B41J 2/135; B41J 2/175; C09D 11/30; C09D 11/322; C09D 11/324
USPC ........... 347/45, 47, 85, 86, 95–100; 523/160, 523/161; 106/31.13, 31.6, 31.65
See application file for complete search history.

(56) References Cited

U.S. PATENT DOCUMENTS

| | | | |
|---|---|---|---|
| 5,952,048 | A | 9/1999 | Tsubuko et al. |
| 6,918,662 | B2 | 7/2005 | Arita et al. |

(Continued)

FOREIGN PATENT DOCUMENTS

JP 2004-059913 2/2004

OTHER PUBLICATIONS

U.S. Appl. No. 08/491,419, filed Jun. 16, 1995, Tsubuko, et al.

(Continued)

*Primary Examiner* — Matthew Luu
*Assistant Examiner* — Rut Patel
(74) *Attorney, Agent, or Firm* — Oblon, Spivak, McClelland, Maier & Neustadt, L.L.P.

(57) ABSTRACT

An inkjet recording apparatus including an ink; and an ink discharging head configured to discharge the ink, wherein the ink discharging head is provided with a nozzle having a silicone-containing water-repellent film on a surface thereof on which the ink contacts, wherein the ink contains a colorant; water; and a water soluble organic solvent, wherein the colorant contains a carbon black partially coated with a resin, and wherein the ink meets the following expressions (1) and (2):

$$1.0 \times 10^4 < N \times R/100 < 1.0 \times 10^6 \qquad (1)$$

$$20.0 < R \leq 100.0 \qquad (2)$$

where R (% by mass) denotes a rate of the mass of the carbon black partially coated with a resin relative to the mass of the colorant, and N denotes the number of coarse particles having a particle diameter of 0.5 μm or more per 5 μL of the ink where the number thereof is determined with a number counting method.

17 Claims, 3 Drawing Sheets

(56) References Cited

U.S. PATENT DOCUMENTS

| | | |
|---|---|---|
| 7,094,813 B2 | 8/2006 | Namba et al. |
| 7,284,851 B2 | 10/2007 | Bannai et al. |
| 7,490,930 B2 | 2/2009 | Morohoshi et al. |
| 7,682,011 B2 | 3/2010 | Namba et al. |
| 7,699,457 B2 | 4/2010 | Namba et al. |
| 7,810,919 B2 | 10/2010 | Kojima et al. |
| 7,892,340 B2 | 2/2011 | Namba et al. |
| 8,029,122 B2 | 10/2011 | Kojima et al. |
| 8,044,114 B2 | 10/2011 | Habashi et al. |
| 8,118,419 B2 | 2/2012 | Morohoshi et al. |
| 8,173,227 B2 | 5/2012 | Morohoshi et al. |
| 2002/0083866 A1 | 7/2002 | Arita et al. |
| 2002/0096085 A1 | 7/2002 | Gotoh et al. |
| 2003/0010252 A1 | 1/2003 | Arita et al. |
| 2003/0064206 A1 | 4/2003 | Koyano et al. |
| 2003/0076394 A1 | 4/2003 | Gotoh et al. |
| 2003/0107632 A1 | 6/2003 | Arita et al. |
| 2005/0007431 A1 | 1/2005 | Koyano et al. |
| 2005/0117008 A1* | 6/2005 | Konishi ............... 347/100 |
| 2005/0168552 A1 | 8/2005 | Arita et al. |
| 2005/0259138 A1* | 11/2005 | Doi ............... 347/100 |
| 2006/0176349 A1 | 8/2006 | Nagai et al. |
| 2008/0302268 A1 | 12/2008 | Arita et al. |
| 2009/0047431 A1 | 2/2009 | Hatada et al. |
| 2009/0135218 A1 | 5/2009 | Morohoshi et al. |
| 2009/0186162 A1 | 7/2009 | Namba et al. |
| 2009/0263632 A1 | 10/2009 | Kojima et al. |
| 2010/0020142 A1 | 1/2010 | Bannai et al. |
| 2010/0112219 A1 | 5/2010 | Yokohama et al. |
| 2010/0271435 A1 | 10/2010 | Kojima et al. |
| 2010/0279035 A1 | 11/2010 | Namba et al. |
| 2011/0164086 A1 | 7/2011 | Goto et al. |
| 2011/0169889 A1 | 7/2011 | Kojima et al. |
| 2011/0205288 A1 | 8/2011 | Matsuyama et al. |
| 2011/0216123 A1 | 9/2011 | Tamai et al. |
| 2011/0300353 A1 | 12/2011 | Habashi et al. |
| 2011/0310166 A1 | 12/2011 | Namba et al. |
| 2011/0318551 A1 | 12/2011 | Nakagawa |
| 2012/0044293 A1 | 2/2012 | Morohoshi et al. |
| 2012/0098883 A1 | 4/2012 | Matsuyama et al. |
| 2012/0113195 A1 | 5/2012 | Katsuragi |
| 2012/0121831 A1 | 5/2012 | Kudoh et al. |
| 2012/0169815 A1 | 7/2012 | Katsuragi |
| 2012/0188312 A1 | 7/2012 | Nakagawa |

OTHER PUBLICATIONS

U.S. Appl. No. 08/662,901, filed Jun. 12, 1996, Tsubuko, et al.
U.S. Appl. No. 13/205,837, filed Aug. 9, 2011, Yokohama, et al.
U.S. Appl. No. 13/472,603, filed May 16, 2012, Nakagawa.

* cited by examiner

INKJET RECORDING APPARATUS, METHOD FOR INKJET RECORDING, AND INK

BACKGROUND OF THE INVENTION

1. Field of the Invention

The present invention relates to an inkjet recording apparatus, a method for inkjet recording, and an ink.

2. Description of the Related Art

An inkjet recording method includes discharging droplets of ink from a fine nozzle head and recording characters or symbols on a surface of a recording medium such as a paper.

Examples of known inkjet recording methods include a method in which an electric signal is converted into a mechanical signal with a piezoelectric element and ink stored in a nozzle head portion is intermittently discharged to thereby record characters or symbols on a surface of a recording medium, and a method in which an ink stored in a nozzle head portion is rapidly heated in the vicinity of an ink discharge port so as to generate bubbles and volume expansion due to the bubbles permits the ink to intermittently discharge to thereby record characters or symbols on a surface of a recording medium.

As an ink used for inkjet recording, for example, an ink containing a water-soluble dye, and an aqueous pigment ink obtained by dispersing pigment particles in water are known. The aqueous pigment ink has recently widely used because of its excellent water resistance and lightfastness.

Examples of the aqueous pigment ink include those obtained by dispersing pigment particles in an aqueous dispersion medium with use of a dispersant such as a surfactant or polymer dispersant and those obtained by dispersing pigment particles of which surface is made to be hydrophilic by, for example, an oxidation reaction.

In the ink obtained by dispersing pigment particles in an aqueous dispersion medium with use of a dispersant such as a surfactant or polymer dispersant, the dispersant is merely attached (adsorbed) to a pigment particle surface and where a strong shear force is applied to the pigment particles when the ink is discharged out through a fine nozzle of a nozzle head, the dispersant attached (adsorbed) to the pigment particle surface may be desorbed, thereby decreasing dispersibility of the pigment particles and deteriorating discharging stability of the ink.

Further, the above-mentioned ink has not sufficient storage stability because the residual of the dispersant remains in the ink, and the dispersant does not sufficiently contribute to dispersion and is detached from the pigment particles to thereby increase viscosity of the ink.

On the other hand, the ink obtained by dispersing pigment particles of which surface is made to be hydrophilic has good storage ability. However, an image formed with the ink has not sufficient fixability, abrasion resistance, and marker resistance against a highlighter pen.

For the purpose of enhancing fixability on a recording medium and dispersion (storage) stability of pigment particles contained in a pigment-type ink, an ink containing microencapsulated pigments obtained by coating colorant particles with a polymer is known.

However, the ink containing microencapsulated pigments results in decreased image density because pigment particles are coated with resin, which makes difficult to obtain a recorded matter having high print density.

An ink discharging head of an inkjet recording apparatus is coated with a water-repellent film in order to stably discharge ink droplets. When the water-repellent film is scraped off, water-repellency is decreased and the ink tends to easily attach and remain in the vicinity of an ink discharge port of a nozzle, which may deteriorate discharge stability.

Japanese Patent Application Laid-Open (JP-A) No. 2004-59913 discloses the ink in which the number of coarse particles is decreased to a certain number or less for the purpose of ensuring storage stability and discharge stability. However, an ink discharging head should be wiped with, for example, rubber blade periodically to remove an ink attached to the head. The wiping operation may scrape the water-repellent film off, which may reduce water-repellency. Accordingly, this ink also suffers from a problem of decreased discharge stability resulting from decreased water-repellency.

SUMMARY OF THE INVENTION

An object of the present invention is to provide an inkjet recording apparatus and a method for inkjet recording which can prevent water-repellency from decreasing in an ink discharging head which is provided with a nozzle having a silicone-containing water-repellent film; have excellent discharge stability; and form high-density images over a long period of time.

An additional object of the present invention is to provide an ink which has excellent storage stability and discharge stability, and can form high-density images for using in the inkjet recording apparatus and the method for inkjet recording.

The present inventors previously conducted studies on this problem and found that, in an ink containing pigment particles coated with resin, when using pigment particles each of which is coated with a small amount of the resin and has large particle diameter and high shielding effect, the high print density can be achieved but another problem, i.e., decreased water-repellency occurs. This is because such a small amount of the resin cannot completely coat pigment particles and an exposed area may remain on a surface of a carbon black to thereby scrape the nozzle's water-repellent film off upon, for example, wiping due to the hardness of the carbon black. The present inventors further conducted studies on preventing decreased water-repellency and found that an ink having excellent storage stability and capable of forming high-density images without decreasing water-repellency can be obtained by allowing the rate of the mass of a carbon black partially coated with resin relative to the mass of a colorant and the number of coarse particles having a particle diameter of 0.5 μm or more in an ink to fall within a certain range.

Means for solving the problems are as follows.

An inkjet recording apparatus of the present invention includes:

an ink; and an ink discharging head configured to discharge the ink, wherein the ink discharging head is provided with a nozzle having a silicone-containing water-repellent film on a surface thereof on which the ink contacts, wherein the ink contains:

a colorant;

water; and a water soluble organic solvent, wherein the colorant contains a carbon black partially coated with a resin, and wherein the ink meets the following expressions (1) and (2):

$$1.0 \times 10^4 < N \times R/100 < 1.0 \times 10^6 \qquad (1)$$

$$20.0 < R \leq 100.0 \qquad (2)$$

where R (% by mass) denotes a rate of the mass of the carbon black partially coated with a resin relative to the mass of the colorant, and N denotes the number of coarse particles having a particle diameter of 0.5 μm or more per 54 of the ink where the number thereof is determined with a number counting method.

An ink of the present invention includes:
a colorant;
water; and
a water soluble organic solvent,
wherein the colorant contains a carbon black partially coated with a resin,
wherein the ink meets the following expressions (1) and (2):

$$1.0\times10^4 < N\times R/100 < 1.0\times10^6 \quad (1)$$

$$20.0 < R \leq 100.0 \quad (2)$$

where R (% by mass) denotes a rate of the mass of the carbon black partially coated with a resin relative to the mass of the colorant, and N denotes the number of coarse particles having a particle diameter of 0.5 μm or more per 5 μL of the ink where the number thereof is determined with a number counting method,
wherein the ink is used for an inkjet recording apparatus, and
wherein the inkjet recording apparatus includes an ink discharging head which is provided with a nozzle having a silicone-containing water-repellent film on a surface thereof on which the ink contacts.

A method for inkjet recording of the present invention includes:
recording an image using an ink and an ink discharging head configured to discharge the ink,
wherein ink discharging head is provided with a nozzle plate having a silicone-containing water-repellent film on a surface thereof on which the ink contacts,
wherein the ink contains:
a colorant;
water; and
a water soluble organic solvent,
wherein the colorant contains a carbon black partially coated with a resin,
wherein the ink meets the following expressions (1) and (2):

$$1.0\times10^4 < N\times R/100 < 1.0\times10^6 \quad (1)$$

$$20.0 < R \leq 100.0 \quad (2)$$

where R (% by mass) denotes a rate of the mass of the carbon black partially coated with a resin relative to the mass of the colorant, and N denotes the number of coarse particles having a particle diameter of 0.5 μm or more per 5 μL of the ink where the number thereof is determined with a number counting method.

As understood from the following detail and specific description, provided are an inkjet recording apparatus and a method for inkjet recording which can prevent decreased water-repellency of a nozzle resulting from wiping operation, have excellent discharge stability, and form high-density images over a long period of time.

Furthermore, provided is an ink which has excellent storage stability and discharge stability, and can form high-density images for using in the inkjet recording apparatus and the method for inkjet recording.

DETAILED DESCRIPTION OF THE INVENTION (Ink)

Figure 1:
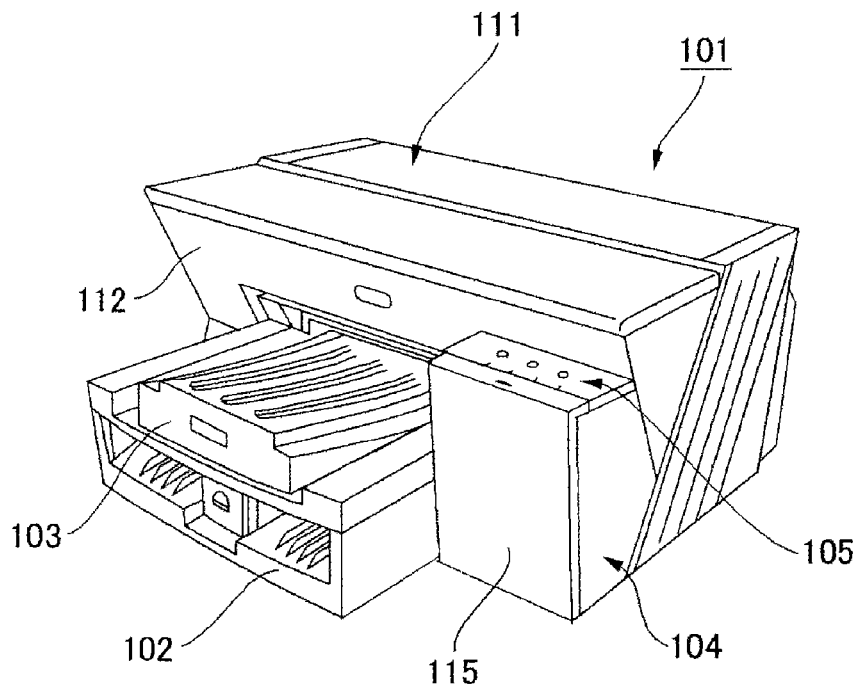
FIG. 1 is a perspective diagram illustrating one example of an inkjet recording apparatus of the present invention in which a cover for an ink cartridge loading section is open.

An ink of the present invention will be described in detail.

The ink of the present invention is used for an inkjet recording apparatus including an ink discharging head which is provided with a nozzle having a silicone-containing water-repellent film on a surface thereof on which the ink contacts, and includes a colorant, water, and a water soluble organic solvent, and, if necessary, further contains other components.

The colorant contains a carbon black partially coated with a resin, and the ink meets the following expressions (1) and (2):

$$1.0\times10^4 < N\times R/100 < 1.0\times10^6 \quad (1)$$

$$20.0 < R \leq 100.0 \quad (2)$$

where R denotes a rate of the mass of the carbon black partially coated with a resin relative to the mass of the colorant, and N denotes the number of coarse particles having a particle diameter of 0.5 μm or more per 5 μL of the ink where the number thereof is determined with a number counting method.

When the R (% by mass), the rate of the mass of the carbon black partially coated with the resin relative to the mass of the colorant, is 20% by mass or less, storage stability and image density may be deteriorated.

The R (% by mass) is not particularly limited as long as it meets the expressions (1) and (2), and may be appropriately selected depending on the intended purpose. However, it is preferably $35.0 < R < 95.0$ in terms of image density and discharge stability.

When the N×R, the product of the number of coarse particles having a particle diameter of 0.5 μm or more (the number per 5 μL of the ink) as determined with a number counting method and the rate of the mass of the carbon black partially coated with a resin relative to the mass of the colorant, is $1.0\times10^4$ or less, image density may be deteriorated because the number of the large-particle diameter particles is decreased and shielding effect cannot be obtained. When the N×R is $1.0\times10^6$ or more, discharge stability and wiping durability may be deteriorated because the water-repellent film tends to be easily scraped off.

The number of coarse particles having a particle diameter of 1.0 μm or more (the number per 5 μL of the ink) as determined with a number counting method is not particularly limited and may be appropriately selected depending on the intended purpose. However, it is preferably $1.0\times10^4$ or less in terms of discharge stability.

Here, the number N of coarse particles having a particle diameter of 0.5 μm or more (the number per 5 μL of the ink) and the number N of coarse particles having a particle diameter of 1.0 μm or more (the number per 5 μL of the ink) can be measured with a number counting method using ACCU- SIZER 780 (manufactured by Particle Sizing Systems Inc.). Specifically, 5 μL of a measurement sample (ink) containing 8.0% by mass of the pigment is added with a micropipette to a glass vessel containing 50 mL of ultrapure water, followed by treating for initiating the measurement. Then, in the device, the measurement sample is diluted with water so that the concentration of the pigment becomes $8.0 \times 10^{-4}$% by mass, and the thus-prepared sample is measured at a flow rate of 1 mL/sec.

Notably, the above number counting method is a method including: allowing a liquid containing particles (e.g., ink) to flow through a thin tube; irradiating the thin tube with semiconductor laser; and detecting with a detector a change in voltage when each particle passes. With this method, the number of the particles can be calculated from the number of pulses measured with the detector and the diameter of each particle can be calculated from the intensity of the pulse measured with the detector.

<Colorant>

The colorant contains a carbon black partially coated with a resin, and, if necessary, further contains other colorants.

<<<Carbon Black Partially Coated with a Resin>>

The carbon black not completely but partially coated with a resin can prevent image density from decreasing, and achieve both storage (dispersion) stability and fixability.

The amount of the resin contained in the carbon black partially coated with the resin is preferably 1% by mass to 40% by mass, more preferably 5% by mass to 35% by mass depending on the type of the resin.

When the amount is less than 1% by mass, storage (dispersion) stability is deteriorated, and the water-repellent film on the nozzle is easily scraped off because the exposed area of the carbon black is increased. When the amount is more than 40% by mass, image density and coloring property are deteriorated.

The term "partially coated" means not a state in which a part of the carbon black surface is unintentionally exposed due to coating defects such as a pinhole and a crack, but a state in which a part of the carbon black surface is intentionally exposed.

The amount of the carbon black partially coated with a resin relative to the colorant is not particularly limited and may be appropriately selected depending on the intended purpose. However, it is preferably 40% by mass to 90% by mass on the basis of the mass of the colorant. When the amount is less than 40% by mass, the image density may somewhat decrease. When the amount is more than 90% by mass, the discharge stability may somewhat decrease.

<<<Carbon Black>>>

The carbon black is not particularly limited and those produced by, for example, furnace method or channel method may be appropriately used depending on the intended purpose. A carbon black having a specific surface measured by BET method of 50 m²/g to 300 m²/g, DBP oil absorption of 40 mL/100 g to 150 mL/100 g, a volatile matter content of 0.5% to 10% and a pH value of 2 to 9 is preferably used.

Examples thereof include No. 2300, No. 900, MCF-88, No. 33, No. 40, No. 45, No. 52, MA7, MA8, MA100, No. 2200B (all manufactured by MITSUBISHI CHEMICAL CORPORATION), RAVEN700, 5750, 5250, 5000, 3500, 1255 (all manufactured by Columbian Chemicals Company), REGAL 400R, 330R, 660R, MOGULL, MONARCH 700, 800, 880, 900, 1000, 1100, 1300, MONARCH 1400 (all manufactured by CABOT CORPORATION), COLOR BLACK FW1, FW2, FW2V, FW18, FW200, S150, S160, S170, PRINTEX 35, U, V, 140U, 140V, SPECIAL BLACK 6, 5, 4A, 4 (all manufactured by EVONIK DEGUSSA Co.), but are not limited thereto.

The average primary particle diameter of the carbon black is not particularly limited and may be appropriately selected depending on the intended purpose. It is preferably 10 nm to 150 nm, more preferably 20 nm to 100 nm, and further preferably 30 nm to 80 nm. When the average primary particle diameter thereof is more than 150 nm, printed images may have low saturation, viscosity of the ink may increases and/or aggregations of particles may occur in the ink during storage, and a nozzle may be clogged during printing. When the average primary particle diameter of the pigment is less than 10 nm, lightfastness and storage stability may be deteriorated.

The average primary particle diameter of the pigment means a median diameter (D50) on the volume basis measured at 23° C. using MICROTRACK UPA-150 (manufactured by Nikkiso Co., Ltd.), a sample which is diluted with pure water to have a pigment concentration of 0.01% by mass, and as parameters, taking a particle refractive index of 1.51, pigment density 1.4 g/cm³, and pure water (as a solvent parameter).

<<<Resin>>>

A partially coating with a resin of the carbon black can improve dispersion stability and prevent the image density from lowering.

The resin is not particularly limited as long as it can disperse in an aqueous medium. An organic polymer material having a hydrophilic group can be suitably used.

The resin with which carbon black is partially coated is not particularly limited and may be appropriately selected depending on the intended purpose. Examples thereof include polyamides, polyurethanes, polyesters, polyureas, epoxy resins, polycarbonates, urea resins, melamine resins, phenol resins, polysaccharides, gelatin, gum arabic, dextran, casein, proteins, natural rubbers, carboxypolymethylenes, polyvinyl alcohols, polyvinyl pyrrolidones, polyvinyl acetates, polyvinyl chlorides, polyvinylidene chlorides, cellulose, ethyl cellulose, methyl cellulose, nitro cellulose, hydroxyethyl cellulose, cellulose acetate, polyethylenes, polystyrenes, (meth)acrylic acid polymers or copolymers, (meth)acrylate polymers or copolymers, (meth)acrylic acid-(meth)acrylate copolymers, styrene-(meth)acrylic acid copolymers, styrene-maleic acid copolymers, sodium alginate, fatty acids, paraffins, beeswax, water wax, hydrogenated beef tallow, carnauba wax and albumin.

Among these, an anionic organic polymer material having an anionic group such as a carboxylic group and a sulfonic group can be used.

A nonionic organic polymer material can be used as the resin. Examples of thereof include polyvinyl alcohol, polyethylene glycol monomethacrylate, polypropylene glycol monomethacrylate, methoxypolyethylene glycol monomethacrylate, or (co)polymers thereof, and cationic ring-opening polymer of 2-oxazoline. Among these, completely saponified polyvinyl alcohol is particularly preferable since it has properties such that the water solubility is low and that it is easily soluble in hot water but is hardly soluble in cold water.

The number average molecular weight of a resin for partially coating a carbon black is not particularly limited and may be appropriately selected depending on the intended purpose. It is preferably 2,000 or more. The mass number average molecular weight of the resin is preferably 5,000 or more.

Conventionally known methods can be used for partially coating a carbon black with a resin. Examples thereof include a microencapsulation method in which particles of a water-insoluble pigment are covered with an organic polymer material to thereby form microcapsules.

The conventional methods known in the art include chemical processes, physical processes, physicochemical methods, and mechanical processes. Specifically, the following methods (1) to (10) can be used.

(1) Interfacial polymerization (a method in which two different monomers or two different reactants are separately dissolved as a disperse phase and a continuous phase, and both materials are allowed to react at the interface of both phases to form a coating film), (2) in-situ polymerization (a method in which a liquid or gaseous monomer and catalyst, or two different reactive materials are supplied from either side of a continuous phase or core particles, and reaction is allowed to occur to form a coating film), (3) Submerged curing coating (a method in which a drop of organic polymer material solution containing particles of a pigment is insolubilized in liquid with, for example, a curing agent, and a coating film is formed), (4) Coacervation (phase separation) (a method in which an organic polymer material dispersion, in which particles of a pigment are dispersed, is separated into a coacervate with high organic polymer material concentration (thick phase) and a dilute phase to form a coating film), (5) Submerged drying (a method in which a liquid, in which particles of a pigment are dispersed in a solution of an organic polymer material, is prepared, this dispersion is put in a solution with which the continuous phase of the dispersion does not mix to form a complex emulsion, and the solvent that dissolves the organic polymer material is removed gradually to thereby form a coating film), (6) Melting dispersion cooling (a method in which an organic polymer material that melts into a liquid state when heated and that becomes solidified at room temperature is utilized, this material is heated and liquefied, particles of a pigment are dispersed therein, the particles are made fine particles, and cooled to form a coating film), (7) Suspension coating in air (a method in which powder particles of a pigment are suspended in an air with a fluidized bed, and while suspending in an air stream, a coating liquid of an organic polymer material is sprayed and mixed to form a coating film), (8) Spray drying (a method in which a liquid of raw materials for encapsulation is sprayed and is brought into contact with hot air, by which volatile portions are evaporated and dried to form a coating film), (9) Acid precipitation (a method in which at least a part of anionic groups of an organic polymer material having anionic groups is neutralized with a basic compound, providing solubility to water, and kneaded in an aqueous medium together with a pigment; then the organic polymer material are precipitated by making the mixture neutral or acid with an acidic compound to allow the organic polymer material to fix on the pigment, then the mixture is neutralized, and the resulting microcapsule is dispersed),

(10) Phase-inversion emulsification (a method in which a mixture, which contains an anionic organic polymer material capable of dispersing in water and contains a pigment, serves as an organic solvent phase, and water is poured in the organic solvent phase, or the organic solvent phase is poured in water).

It is preferable that an appropriate organic polymer material be selected depending on the method for microencapsulation. In the case of (1) Interfacial polymerization, for example, polyester resins, polyamide resins, polyurethane resins, polyvinyl pyrrolidone resins, and epoxy resins are appropriate. In the case of (2) in-situ polymerization, for example, polymers or copolymers of (meth)acrylic acid ester, copolymers of (meth)acrylic acid and (meth)acrylic acid ester, copolymers of styrene and (meth)acrylic acid, polyvinyl chloride, polyvinylidene chloride, and polyamides are appropriate. In the case of (3) Submerged curing coating, for example, sodium alginate, polyvinyl alcohol, gelatin, albumin, and epoxy resin are appropriate. In the case of (4) Coacervation, for example, gelatin, celluloses, and casein are appropriate.

When the (10) Phase-inversion emulsification method or (9) Acid precipitation method is used as the method for partially coating the carbon black with a resin, an anionic organic polymer material is preferably used as the organic polymer material forming a coating film of a microcapsule.

When the phase-inversion emulsification method is used as the method for partially coating the carbon black with a resin, a composite or complex of an anionic organic polymer material having a self-dispersing ability or dissolution ability in water, and a carbon black, or a mixture of a carbon black, a curing agent, and an anionic organic polymer material, can be prepared as an organic solvent phase and, water is poured into the organic solvent phase to microencapsulate the carbon black while being self-dispersed (phase-inversion emulsified). Alternatively, the organic solvent phase may be poured into water.

In the above-mentioned phase-inversion emulsification method, a vehicle or additives for ink may be added to the organic solvent phase to produce a microcapsule, which does not cause any problems. In particular, from the viewpoint that a dispersion liquid for ink can be produced directly, the addition of a liquid medium of ink is preferable.

When the acid precipitation method is used as the method for partially coating the carbon black with a resin, a part or all of anionic groups in a water-containing cake may be neutralized with a basic compound to perform microencapsulation, wherein the water-containing cake is prepared by a process comprising a step in which a part or all of anionic groups of anionic group-containing organic polymers are neutralized with a basic compound, and is kneaded in an aqueous medium together with a color material such as a self-dispersing organic pigment or self-dispersing carbon black; and a step in which pH is adjusted to neutral or acid with an acidic compound, and the anionic group-containing organic polymers are precipitated to allow the organic polymers to fix on the pigment.

In this way, an aqueous dispersion can be produced that comprises an anionic microencapsulated pigment which is fine and contains a pigment in large amount.

The solvent for use during the above-mentioned microencapsulation is not particularly limited and may be appropriately selected depending on the intended purpose. Examples thereof include alkyl alcohols such as methanol, ethanol, propanol, and butanol; aromatic hydrocarbons such as benzol, toluol, and xylol; esters such as methyl acetate, ethyl acetate, and butyl acetate; chlorinated hydrocarbons such as chloroform, and ethylene dichloride; ketones such as acetone, and methyl isobutyl ketone; ethers such as tetrahydrofuran and dioxane; Cellosolves (registered trademark) such as methyl Cellosolve and butyl Cellosolve; and the like. An ink of interest that can be used in the present invention is obtained by separating the microcapsule prepared by the above-mentioned method from these solvents by means of centrifugation or filtration, stirring this with water and necessary solvents, and dispersing again.

A carbon black partially coated with a resin can be obtained by the above-mentioned methods. The carbon black partially coated with a resin preferably has a median diameter (D50) on the volume basis of 50 nm to 180 nm.

<<Other Colorant>>

In addition to the carbon black partially coated with the resin, the colorant of the present invention can contain a carbon black dispersed using surfactant or a self-dispersing carbon black without departing from the scope of the present invention.

The carbon black dispersed using surfactant is a carbon black dispersed in a liquid by the action of a surfactant which is attached to the surface of the carbon black particles. In this case, even when the particle diameters of the pigment particles are large, the surface of the carbon black particles can be surrounded by the surfactant if there is a sufficient amount of the surfactant or a sufficient number of functional groups. Accordingly, the carbon black has less possibility of scraping the water-repellent film off, but the surfactant may be detached from the carbon black particles to thereby increase the viscosity of the dispersion liquid, which may deteriorate storage stability.

The self-dispersing carbon black is a carbon black dispersed in a liquid by the action of hydrophilic functional groups which are present on the surface of the carbon black particles. There are exposed areas on the carbon black particles, therefore the water-repellent film tends to be scraped off, which may deteriorate discharge stability.

<Water Soluble Organic Solvent>

The water soluble organic solvent is not particularly limited and may be appropriately selected depending on the intended purpose. It preferably contains at least one polyhydric alcohol having the equilibrium moisture content (EMC) of 40% by mass or more in the environment of 23° C. and 80% RH, more preferably contains a combination of a water soluble organic solvent A having the high viscosity and high boiling point and a water soluble organic solvent B having the low viscosity and low boiling point.

The water soluble organic solvent A is not particularly limited and may be appropriately selected depending on the intended purpose, but preferably has the boiling point of higher than 250° C. under the normal pressure. Examples thereof include 1,2,3-butanetriol, 1,2,4-butanetriol (bp: 190° C.-191° C./24 hPa), glycerin (bp: 290° C.), diglycerin (bp: 270° C./20 hPa), triethylene glycol (bp: 285° C.), and tetraethylene glycol (bp: 324° C.-330° C.).

The water soluble organic solvent B is not particularly limited and may be appropriately selected depending on the intended purpose, but preferably has the boiling point of 140° C. or more to less than 250° C. under the normal pressure. Examples thereof include diethylene glycol (bp: 245° C.), and 1,3-butanediol (bp: 203° C.-204° C.).

Among them, a combination of glycerin and 1,3-butanediol is particularly preferable.

A mass ratio of the water soluble organic solvent A and the water soluble organic solvent B (B/A) is not particularly defined as it depends, to a certain extent, on an amount of a water soluble organic solvent or wetting agent C, which will be described later, and amounts and types of other additives for use, such as a penetrating agent, but for example it is preferably 10/90 to 90/10.

In the present invention, the equilibrium moisture content can be obtained by storing a Petri dish in which 1 g of each water soluble organic solvent is weight and placed in a desiccator in which the temperature and humidity are maintained at 23° C.±1° C., and 80% RH±3% RH, respectively, using a saturated aqueous solution of potassium chloride until any change in mass is not observed, and calculating based on the following equation:

Equilibrium Water Content (%)=Amount of water absorbed into water soluble organic solvent/ Amount of water soluble organic solvent×100

In the recording ink of the present invention, other than the water soluble organic solvents A and B mentioned above, other water soluble organic solvents, i.e. a water soluble organic solvent or wetting agent C, may be used instead of or in addition to the water soluble organic solvents A and B.

Examples of the water-soluble organic solvent or wetting agent C include polyvalent alcohols, polyvalent alcohol alkyl ethers, polyvalent alcohol alkyl ethers, nitrogen-containing heterocyclic compounds, amides, amines, sulfur-containing compounds, propylene carbonates, ethylene carbonates, and other water-soluble organic solvents or wetting agents.

Examples of polyvalent alcohols include dipropylene glycol (bp: 232° C.), 1,5-pentanediol (bp: 242° C.), 3-methyl-1,3-butanediol (bp: 203° C.), propylene glycol (bp: 187° C.), 2-methyl-2,4-pentanediol (bp: 197° C.), ethylene glycol (bp: 196° C.-198° C.), tripropylene glycol (bp: 267° C.), hexylene glycol (bp: 197° C.), polyethylene glycol (viscous liquid to solid), polypropylene glycol (bp: 187° C.), 1,6-hexanediol (bp: 253° C.-260° C.), 1,2,6-hexanetriol (bp: 178° C.), trimethylol ethane (solid, mp: 199° C.-201° C.), and trimethylol propane (solid, mp: 61° C.).

Examples of polyvalent alcohol alkyl ethers include ethylene glycol monoethyl ether (bp: 135° C.), ethylene glycol monobutyl ether (bp: 171° C.), diethylene glycol monomethyl ether (bp: 194° C.), diethylene glycol monobutyl ether (bp: 231° C.), ethylene glycol mono-2-ethylhexylether (bp: 229° C.), and propylene glycol monoethyl ether (bp: 132° C.).

Examples of polyvalent alcohol aryl ethers include ethylene glycol monophenyl ether (bp: 237° C.), and ethylene glycol monobenzyl ether.

Examples of nitrogen-containing heterocyclic compound include N-methyl-2-pyrrolidone (bp: 202° C.), 1,3-dimethyl-2-imidazolidinone (bp: 226° C.), ε-caprolactam (bp: 270° C.), and γ-butyrolactone (bp: 204° C.-205° C.).

Examples of amides include formamide (bp: 210° C.), N-methyl formamide (bp: 199° C.-201° C.), N,N-dimethyl formamide (bp: 153° C.), and N,N-diethyl formamide (bp: 176° C.-177° C.).

Examples of amines include monoethanol amine (bp: 170° C.), diethanol amine (bp: 268° C.), triethanol amine (bp: 360° C.), N,N-dimethylmonoethanol amine (bp: 139° C.), N-methyldiethanol amine (bp: 243° C.), N-methylethanol amine (bp: 159° C.), N-phenylethanol amine (bp: 282° C.-287° C.), and 3-aminopropyldiethylamine (bp: 169° C.).

Examples of sulfur-containing compound include dimethyl sulfoxide (bp: 139° C.), sulfolane (bp: 285° C.), and thiodiglycol (bp: 282° C.).

As other solid wetting agent, for example, saccharides are preferable. Examples of the saccharides include monosaccharides, disaccharides, oligosaccharides (including trisaccharides, and tetrasaccharides), and polysaccharides. Examples thereof include glucose, mannose, fructose, ribose, xylose, arabinose, galactose, maltose, cellobiose, lactose, sucrose, trahalose, and maltotriose. Here, "polysaccharide" means sugar in a broad sense, and include compounds widely present in the nature, such as α-cyclodextrin, and cellulose. Moreover, examples of derivatives of these saccharides include reducing sugars (e.g. sugar alcohol represented by the General Formula: $HOCH_2(CHOH)_nCH_2OH$ (n is an integer of 2 to 5)), sugar acids (e.g. aldonic acid, and uronic acid), amino acids, and thio acids. Among them, sugar alcohol is preferable, and specific examples thereof include maltitol and sorbitol.

<Other Component>
<<Penetrating Agent>>

The ink of the present invention may contain a penetrating agent. By adding the penetrating agent to the ink, the surface tension of the ink is decreased, to thereby increase the speed of penetration of the ink into a recording medium after ink droplets are deposited on the recording medium such as paper. Therefore, occurrences of feathering and color bleeding are reduced.

A surfactant can be used as the penetrating agent, and is classified into a nonionic surfactant, an anionic surfactant, and an amphoteric surfactant depending on polarity of a hydrophilic group contained therein. In addition, the surfactant is classified into, for example, a fluorosurfactant, a silicon surfactant, and an acetylene surfactant depending on a structure of a hydrophobic group contained therein.

Examples of the nonionic surfactant include polyol, glycol ether, polyoxyethylene alkyl ether, polyoxyethylene polyoxypropylene alkyl ether, polyoxyethylene alkyl ester, polyoxyethylene sorbitan fatty acid ester, polyoxyethylene alkylphenyl ether, polyoxyethylene alkyl amine, polyoxyethylene alkyl amide, and acetylene glycol.

Examples of the anionic surfactant include polyoxyethylene alkyl ether acetate, dodecyl benzene sulfonate, laurate, and a salt of polyoxyethylene alkyl ether sulfate.

Examples of the fluorosurfactant include perfluoroalkyl sulfonate, perfluoroalkyl carboxylate, perfluoroalkyl phosphoric acid ester, perfluoroalkylethylene oxide adducts, perfluoroalkyl betaine, and perfluoroalkyl amine oxide compounds. Examples of the commercially available fluorosurfactant include SURFLON S-111, S-112, S-113, S121, S131, S132, S-141, S-144, S-145 (all manufactured by AGC SEIMI CHEMICAL CO., LTD.), FLOURAD FC-93, FC-95, FC-98, FC-129, FC-135, FC-170C, FC-430, FC-431, FC-4430 (all manufactured by Sumitomo 3M Limited), MEGAFAC F-470, F-1405, F474 (all manufactured by DIC Corporation), ZONYL FS-300, FSN, FSN-100, FSO, FSO-100 (all manufactured by Du Pont Kabushiki Kaisha), EFTOP EF-351, 352, 801, 802 (all manufactured by Mitsubishi Materials Electronic Chemicals Co., Ltd), FT-250 251 (all manufactured by NEOS COMPANY LIMITED), PF-151N, PF-136A, PF-156A (all manufactured by OMNOVA Solutions Inc.) Among them, FSO, FSO-100, FSN, FSN-100, and FS-300 from Du Pont Kabushiki Kaisha are preferable because use thereof helps to obtain excellent printing quality and storage stability.

A polyether-modified silicone compound can be preferably used as the silicone surfactant. The polyether-modified silicone compound is classified into a side-chain type (pendant type) in which polyether groups are introduced at side chains of polysiloxane, a side-terminal type in which a polyether group is introduced at one terminal of polysiloxane, a both-terminal type (ABA type) in which polyether groups are respectively introduced at both terminals of polysiloxane, a side-chain and both-terminal type in which polyether groups are introduced at side chains and both terminals of polysiloxane, an ABn-type in which (A) polysiloxane to which a polyether group(s) is (are) introduced and (B) polysiloxane to which no polyether group is introduced are bonded in turn, and a branch type in which a polyether group(s) is (are) introduced at a terminal(s) of branched polysiloxane.

The silicone surfactant for use in the present invention is preferably the side chain type (pendant type) having a structure such that polyether groups are introduced at side chains of polysiloxane. The polyether-modified silicone compound represented by the following General Formula (1) is preferable.

The ink preferably further contains 0.01% by mass to 5% by mass of the polyether-modified silicone compound represented by the following General Formula (1) in terms of discharge stability.

General Formula 1

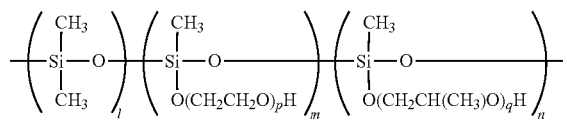

In the General Formula (1) above, l, m, n, p, and q each independently denote a natural number; and meet the following expressions: l+m+n<2,000 and p+q<100.

Examples of the commercially available product thereof include KF-351A, KF-352A, KF-353, KF-354L, KF-355A, KF-615A, KF-945, KF-618, KF-6011, KF-6015, KF-6004 (all manufactured by Shin-Etsu Chemical Co., Ltd.), SF-3771, SF-8427, SF-8428, SH-3749, SH-8400, FZ-2101, FZ-2104, FZ-2118, FZ-2203, FZ-2207, L-7604 (all manufactured by Dow Corning Toray Co., Ltd.), and BYK-345, BYK-346, BYK-348 (all manufactured by BKY Japan KK).

Examples of the acetylene surfactant include acetylene glycol surfactant such as 2,4,7,9-tetramethyl-5-decyne-4,7-diol, 3,6-dimethyl-4-octyne-3,6-diol, 3,5-dimethyl-1-hexyn-3-ol.

The acetylene surfactant may be available as a commercial product, and examples thereof include SURFYNOL 104, 82, 465, 485, and TG (all manufactured by Air Products and Chemicals, Inc.).

In the case where the surfactant is added to the ink as a penetrating agent, the amount of the surfactant to be added is preferably 0.01% by mass to 5% by mass, more preferably 0.1% by mass to 3% by mass.

Two or more surfactants may be used in combination for the ink of the present invention. Moreover, C8-11 polyol such as 2-ethyl-1,3-hexanediol, and 2,2,4-trimethyl-1,3-pentanediol may be added in combination with the surfactant to increase penetration performance of the ink.

<<Dispersing Agent>>

The ink of the present invention may contain a dispersing agent such as a polymer dispersing agent and a surfactant. For example, a conventional water-soluble resin and water-soluble surfactant can be used as the dispersing agent for dispersing pigment particles.

Examples the water-soluble resin include styrene, styrene derivatives, vinylnaphthalene derivatives, aliphatic alcohol ester of α,β-ethylenically unsaturated carboxylic acid; block copolymers, random copolymers or salts thereof containing at least 2 or more monomers selected from, for example, acrylic acid, acrylic acid derivatives, maleic acids, maleic acid derivatives, itaconic acid, itaconic acid derivatives, fumaric acid, and fumaric acid derivatives. The above-mentioned water-soluble resin is alkali-soluble resin, which is soluble in an aqueous solution in which a base is dissolved. Among them, those having the mass average molecular weight of 3,000-20,000 are particularly preferable because they have an advantage in that the viscosity of a resultant dispersion liquid can be lowered or dispersion can easily be performed when used for recording liquid for ink jet.

The water-soluble surfactant is generally classified into a nonionic surfactant, an anionic surfactant, and an amphoteric surfactant, and may be appropriately selected depending on the type of a pigment used or formulation of an ink.

Examples of the nonionic surfactant include: polyoxyethylene alkyl ether such as polyoxyethylene lauryl ether, polyoxyethylene myristyl ether, polyoxyethylene cetyl ether, polyoxyethylene stearyl ether, and polyoxyethylene oleyl ether; polyoxyethylene alkylphenyl ether such as polyoxyethylene octylphenyl ether, and polyoxyethylene nonylphenyl ether; polyoxyethylene-α-naphthyl ether, polyoxyethylene-β-naphthyl ether, polyoxyethylene monostyrylphenyl ether, polyoxyethylene distyrylphenyl ether, polyoxyethylene alkylnaphthyl ether, polyoxyethylene monostyrylnaphthyl ether, and polyoxyethylene distyrylnaphthyl ether. Moreover, the aforementioned surfactants in which part of polyoxyethylene is replaced with polyoxypropylene (e.g. polyoxyethylene-polyoxypropylene block copolymers), and condensates in which compounds having aromatic rings (e.g. polyoxyethylene alkylphenyl ether) are condensed with formalin can be also used.

The nonionic surfactant preferably has a hydrophilic-lipophilic balance (HLB) value of 12 to 19.5, more preferably 13 to 19. When the HLB value is less than 12, there is a problem in compatibility of the surfactant to a dispersion medium and thus dispersion stability may be deteriorated. When the HLB value is more than 19.5, the surfactant cannot easily adsorb pigment particles and thus dispersion stability may be deteriorated.

Examples of the anionic surfactant include polyoxyethylene alkyl ether sulfate, polyoxyethylene alkylphenyl ether sulfate, polyoxyethylene monostyrylphenyl ether sulfate, polyoxyethylene distyrylphenyl ether sulfate, polyoxyethylene alkyl ether phosphate, polyoxyethylene alkylphenyl ether phosphate, polyoxyethylene monostyrylphenyl ether phosphate, polyoxyethylene distyrylphenyl ether phosphate, polyoxyethylene alkyl ether carboxylate, polyoxyethylene alkylphenyl ether carboxylate, polyoxyethylene monostyrylphenyl ether carboxylate, polyoxyethylene distyrylphenyl ether carboxylate, naphthalene sulfonate-formalin condensate, melanin sulfonate-formalin condensate, dialkylsulfosuccinate, sulfosuccinic acid alkyl dichloride, polyoxyethylene alkylsulfosuccinic acid dichloride, alkyl sulfoacetate, α-olefin sulfonate, alkylbenzene sulfonate, alkylnaphthalene sulfonate, alkyl sulfonate, N-acyl amino acid salt, acylated peptide, and soap.

The ink of the present invention may include, for example, a defoaming agent, a pH controlling agent, a preservative/anti-fungal agent, a rust-preventive agent, an antioxidant, a UV absorber, an oxygen absorber, and a light stabilizer.

The defoaming agent is not particularly limited and may be appropriately selected depending on the intended purpose. Suitable examples thereof include a silicone defoaming agent, a polyether defoaming agent, and an aliphatic ester defoaming agent. The defoaming agent may be used alone or in combination. Among them, the silicone defoaming agent is preferable in view of an excellent deforming effect.

Examples of the pH controlling agent include amines such as diethanol amine and triethanol amine, alkali metal hydroxides such as lithium hydroxide, sodium hydroxide and potassium hydroxide, ammonium hydroxide, quaternary ammonium hydroxide, quaternary phosphonium hydroxide, alkali metal carbonates such as lithium carbonate, sodium carbonate, and potassium carbonate.

Examples of the preservative/anti-fungal agent include 1,2-benzisothiazolin-3-one, sodium dehydroacetate, sodium sorbate, sodium 2-pyridinethiol-1-oxide, sodium benzoate and sodium pentachlorophenol.

The pH controlling agent is not limited as long as it can adjust the pH to 7 or higher without harmful effects to the ink to be prepared, and any material may be used as the pH controlling agent depending on the intended purpose.

Examples of the rust-preventive agent include acid sulfite, sodium thiosulfate, ammonium thiodiglycolate, diisopropyl ammonium nitrite, pentaerythritol tetranitrate, and dicyclohexylammonium nitrite.

Examples of the antioxidant include phenolic antioxidants (including hindered phenolic antioxidants), amine antioxidants, sulphur antioxidants, and phosphorus antioxidants.

The properties of the ink of the present invention may be appropriately adjusted depending on the intended purpose. For example, the ink preferably has the viscosity at 25° C. of 5 mPa·s to 20 mPa·s, more preferably 6 mPa·s to 15 mPa·s. When the viscosity is more than 20 mPa·s, it may be difficult to ensure discharge stability.

The ink preferably has the surface tension of 20 mN/m to 40 mN/m at 25° C. When the surface tension is less than 20 mN/m, a large amount of ink runs on a recording medium and the ink may not be stably sprayed. When the surface tension is more than 40 mN/m, a sufficient amount of ink may not penetrate a recording medium, which may prolong a drying time. The ink preferably has the pH of 7 to 10.

<Inkjet Recording Apparatus and Method for Inkjet Recording>

An inkjet recording apparatus of the present invention includes an ink and an ink discharging head configured to discharge the ink. The ink discharging head is provided with a nozzle having a silicone-containing water-repellent film on a surface thereof on which the ink contacts. The ink is the ink of the present invention described above.

A method for inkjet recording includes recording an image using an ink and an ink discharging head configured to discharge the ink The ink discharging head is provided with a nozzle plate having a silicone-containing water-repellent film on a surface thereof on which the ink contacts The ink is the ink of the present invention described above.

The method for inkjet recording can be suitably performed using the inkjet recording apparatus.

The ink of the present invention can be suitably used for various recording apparatus of inkjet recording, such as inkjet recording printers, facsimile devices, copiers, and printer-facsimile-photocopier complex devices. In addition, the ink of the present invention has excellent properties such that no deposition of the ink is caused on an inkjet head of a recording apparatus, the inkjet head having an ink repellent layer containing a fluorosilane coupling agent or a silicone resin.

Next, the inkjet recording apparatus which is an embodiment of the present invention will be described hereinafter with reference to the drawings.

An inkjet recording apparatus shown in FIG. 1 is equipped with an apparatus body 101, a feeder tray 102 attached to the apparatus body 101 for feeding papers, a paper output tray 103 attached to the apparatus body 101 for receiving papers on which images are recorded (formed), and an ink cartridge mounting part 104.

Figure 5:
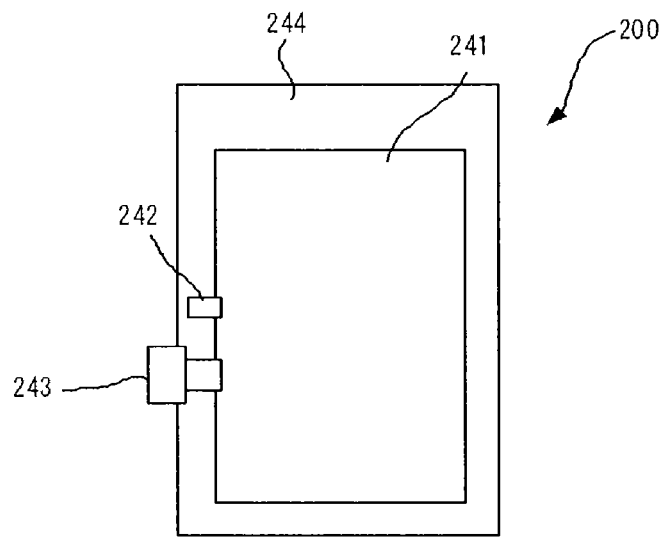
FIG. 5 is a diagram illustrating an ink cartridge in which the ink-storing bag in FIG. 4 is accommodated in a cartridge case.

An operation part 105 having operation keys and indicators is provided on the top surface of the ink cartridge mounting part 104. The ink cartridge mounting part 104 has a front cover 115 that can be opened and/or closed to remove and/or place ink cartridges 200 as shown in FIG. 5. The numerical reference 111 denotes an upper cover, and the numerical reference 112 denotes a front face of the front cover.

Figure 2:
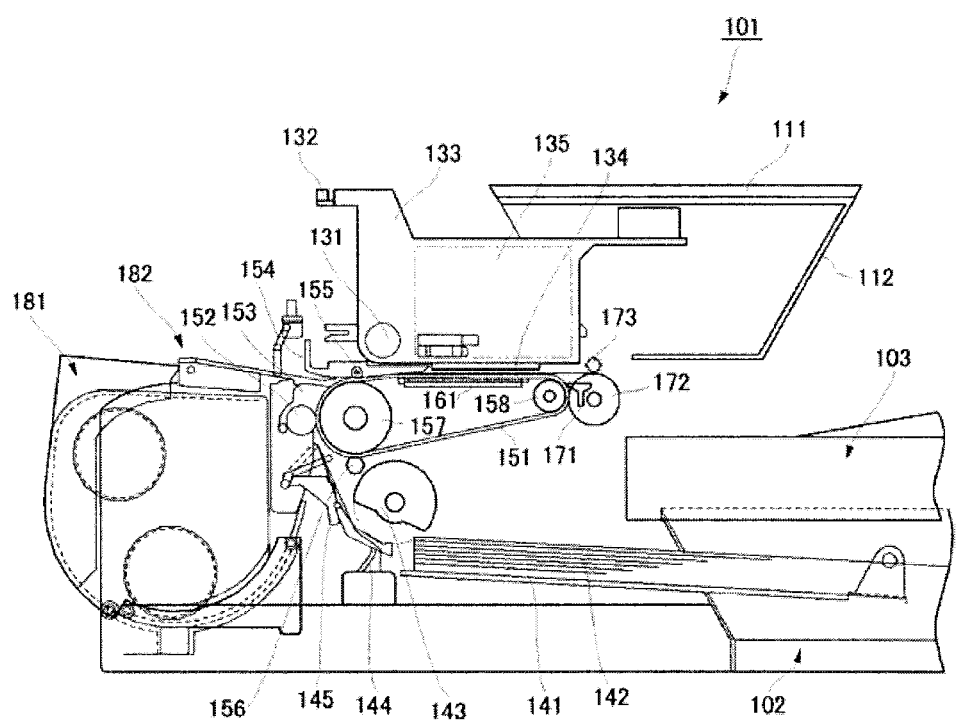
FIG. 2 is a diagram illustrating one example of an inkjet recording apparatus of the present invention.
Figure 3:
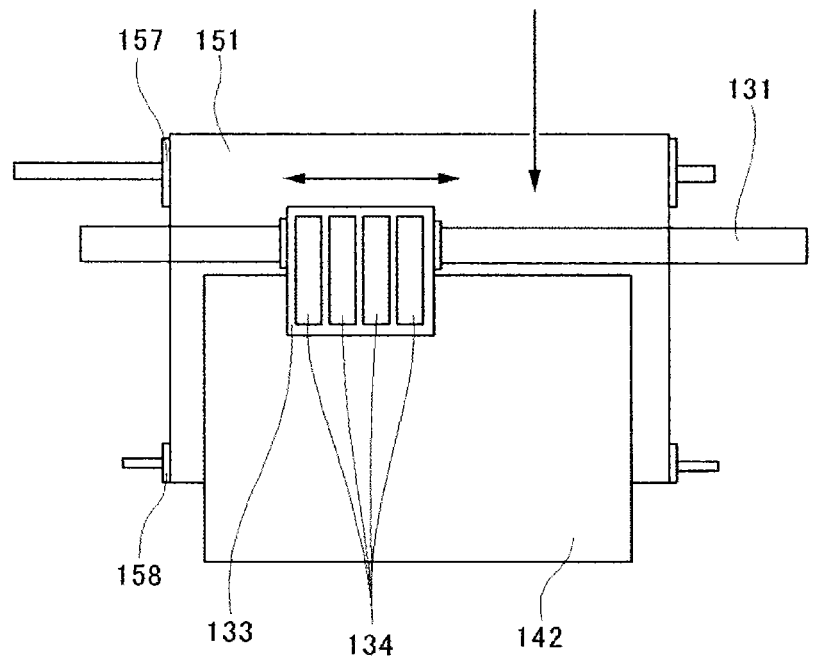
FIG. 3 is an enlarged diagram illustrating one example of an ink discharging head in an inkjet recording apparatus of the present invention.

In the apparatus body 101, as shown in FIGS. 2 and 3, a carriage 133 is supported slidably in a main-scan direction by a guide rod 131 that is a guide member laid across right and left side plates (not shown) and a stay 132, and moved by a main scan-motor (not shown) in the directions indicated by the horizontal arrow (carriage-scan direction) in FIG. 3 for scanning within the apparatus body 101. Note that, the vertical arrow in FIG. 3 represents a belt and paper conveying direction.

In the carriage 133, recording heads 134 consisting of four ink discharging heads that discharge yellow (Y), cyan (C), magenta (M), and black (B) ink droplets, respectively, have ink discharge ports arranged in the intersecting direction with the main-scan direction and they are placed with their ink discharge direction downward.

Inkjet discharging heads constituting the recording heads 134 can be used which are provided with an energy generation unit for discharging ink such as a piezoelectric actuator such as an piezoelectric element, a thermal actuator using an electrothermal conversion element such as an exothermic resistor to cause film boiling and, accordingly, phase change of a liquid, a shape-memory alloy actuator using metal phase changes due to temperature changes, and an electrostatic actuator using electrostatic force.

The carriage 133 is provided with subtanks 135 for supplying each ink to the recording heads 134. The subtanks 135 are filled with the ink of the present invention supplied from the ink cartridge 200 which stores the ink of the present invention and is mounted in the ink cartridge mounting part 104 via an ink supply tube (not-shown).

In the meanwhile, a paper feed part for feeding paper 142 stuck on a paper load part (platen) 141 of the feeder tray 102 is provided with a half-moon roller (a feed roller 143) that separates and supplies the paper 142 from the paper load part 141 one by one, and a separation pad 144 that faces the feed roller 143 and is made of a large friction coefficient material. The separation pad 144 is biased toward the feed roller 143.

A conveying part for conveying the paper 142 supplied from the paper feed part underneath the recording heads 134 is provided with a conveying belt 151 for electrostatically adsorbing and conveying the paper 142, a counter roller 152 for conveying the paper 142 sent from the paper feed part via a guide 145 by clamping it together with the conveying belts 151, a conveying guide 153 for turning the paper 142 sent nearly vertically by 90° so as to lay it on the conveying belt 151, and a leading end pressure roller 155 that is biased toward the conveying belt 151 by a presser member 154. A charging roller 156 that is a charging unit for charging the surface of the conveying belt 151 is also provided.

The conveying belt 151 is an endless belt, being spanned over conveying roller 157 and a tension roller 158 and running around in the belt conveying direction. For example, the conveying belt 151 has a front layer that is a paper adsorbing surface made of a dragging-uncontrolled resin, for example a copolymer of tertafluoroethylene and ethylene (ETFE), having a thickness of around 40 µm, and a back layer (an intermediate dragging layer or an earth layer) made of the same material as the front layer, but dragging-controlled with carbon. A guide member 161 is provided behind the conveying belt 151 at the corresponding position to the printing area by the recording heads 134. An output part for discharging the paper 142 on which recording was done by the recording heads 134 is provided with a separation click 171 for separating the paper 142 from the conveying belt 151, a paper output roller 172, and an paper output roller 173. The paper output tray 103 is disposed below the paper output roller 172.

A double-side feed unit 181 is detachably mounted in the back of the apparatus body 101. The double-side feed unit 181 takes in the paper 142 that is moved backward as the conveying belt 151 is rotated in the reverse direction, turns it over, and feeds it again between the counter roller 152 and the conveying belt 151. A manual feeder 182 is provided on the top surface of the double-side feed unit 181.

In the inkjet recording apparatus having the configuration stated above, the papers 142 supplied from the paper feed part are separated one by one, the paper 142 sent vertically is then guided via guide 145 and conveyed by clamping it between the conveying belt 151 and the counter roller 152. Then, a leading end of the paper 142 is guided via a conveying guide 153 and biased toward the conveying belt 151 by a leading end pressure roller 155 thereby being turned by about 90°.

At this time, the conveying belt 151 has been charged by a charge roller 156, and the conveying belt 151 electrostatically adsorb the paper 142 to convey the paper 142. Ink droplets are discharged on the paper 142 that is at a stop by driving the recording heads 134 according to the image signals while moving the carriage 133 to record the image by one-line. After the paper 142 is conveyed by a predetermined length, the image is recorded by the subsequent line. By receiving a recording end signal or a signal indicating that the rear end of the paper 142 has reached the recording area, the recording operation is terminated and the paper 142 is discharged to the paper output tray 103.

When it is detected that the remaining amount of the ink in the subtank 135 is nearly to the end, a certain amount of ink is supplied to the subtank 135 from the ink cartridge 200.

In this inkjet recording apparatus, when the ink in the ink cartridge 200 of the present invention is used up, it is possible to disassemble the housing in the ink cartridge 200 and replace only the interior ink-storing bag. Further, the ink cartridge 200 can stably supply the ink even when the ink cartridge 200 is vertically placed and has a front loading construction. Therefore, even when the installation is made in the state where a space over the top face of the apparatus body 101 is blocked off, for example, even when the apparatus body 101 is housed in a rack, or objects are laid on the top face of the apparatus body 101, the ink cartridge 200 can be easily replaced.

Here, descriptions have been given of the case where the present invention is applied to a serial type (shuttle type) inkjet recording apparatus in which carriage performs scanning. However, the present invention can be similarly applied to a line type inkjet recording apparatus provided with a line type head.

Figure 4:
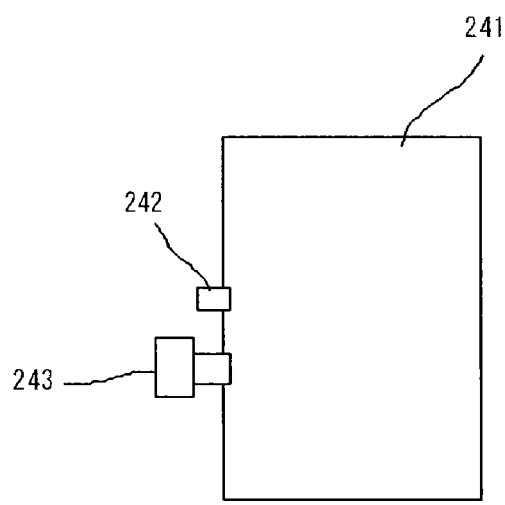
FIG. 4 is a diagram illustrating one example of an ink-storing bag in an ink cartridge of the present invention.

Next, the ink cartridge in FIGS. 4 and 5 will be described. The ink cartridge 200 is introduced into the ink-storing bag 241 from an ink inlet 242, followed by releasing the air, and then the ink-storing bag 241 is sealed by closing the ink inlet 242 with heat. When the ink cartridge is used, the ink cartridge is set in the apparatus by inserting a needle equipped with the body of the apparatus into an ink outlet 243 formed of a rubber member to supply the ink to the apparatus.

The ink-storing bag 241 is formed of a wrapping member such as an aluminum laminate film. This ink-storing bag 241 is generally accommodated in the cartridge case 244, formed of a plastic, and it is detachably mounted to various inkjet recording apparatus.

Figure 6:
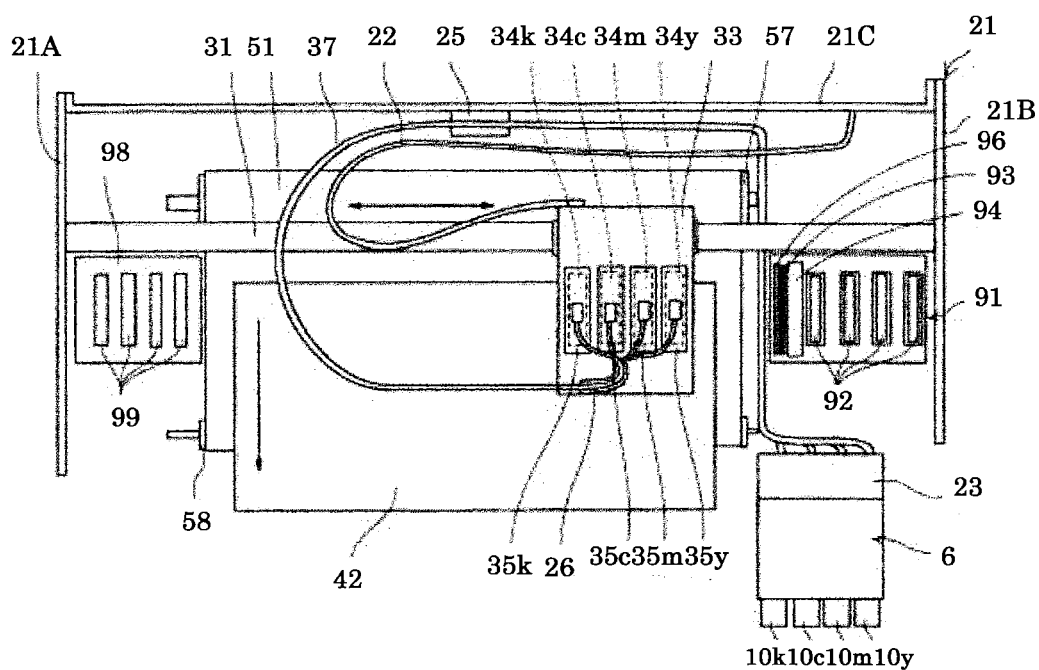
FIG. 6 is a front diagram illustrating a construction of one example of an inkjet recording apparatus of the present invention.

Further, as shown in FIG. 6, in a non-printing region on one side of the inkjet recording apparatus in the scanning direction of a carriage 33, a condition keeping unit 91 for keeping a condition for a nozzle of a recording head 34 and recovering the condition may be placed. The condition keeping unit 91 is, for example, equipped with caps 92 for capping each of nozzle surfaces of the recording head 34, a wiper blade 93 for wiping the nozzle surfaces, blank ejection receivers 94 for receiving droplets that do not contribute to recording but eject a thickened recording liquid, a wiper cleaner 94 that is integrated with the blank ejection receiver 94 into one unit and serves as a cleaning member to remove recording liquid adhered to the wiper blade 93, and a cleaner roller 96 constituting a cleaning unit that pushes the wiper blade 93 against the wiper cleaner 94 when the wiper blade 93 is cleaned. In the above-mentioned structure, when the recording head 34 will pass through the location of the wiper blade 93 and will be projected in the traveling route, the ejection port of the recording head 34 is to be wiped.

In FIG. 6, the numerical reference 10 denotes an ink cartridge, the numerical reference 21 denotes a frame, the numerical reference 23 denotes a supply pump unit, the numerical reference 33 denotes a carriage, the numerical reference 34 denotes a head, the numerical reference 35 denotes a subtank, the numerical reference 26 denotes a tube, the numerical reference 42 denotes a paper, and the numerical reference 51 denotes a conveying belt. In addition, the horizontal arrow in FIG. 6 represents a carriage-scan direction, and the vertical arrow in FIG. 6 represents a paper conveying direction on a belt.

Conventionally known rubber or elastomer can be used as the wiper blade material. Examples thereof include fluororubber, silicone rubber, and EPDM. Among them, preferable is EPDM.

The inkjet recording apparatus is not limited to the above-mentioned inkjet recording apparatus and may be appropriately modified depending on the intended purpose in terms of a method, mechanism, and condition of a wiping.

<<Ink Discharging Head>>

The ink discharging head is provided with a nozzle having a silicone-containing water-repellent film on the surface on which an ink contacts.

The silicone is organopolysiloxanes having as a basic skeleton a siloxane bond consisting of Si and O, and organic groups at side chains.

The method of forming a silicone-containing water-repellent film on a nozzle surface is not particularly limited and may be appropriately selected depending on the intended purpose. Examples of the method include application of a liquid silicone solution or dispersion with, for example, a spin coating, dipping, and spray coating, and electrodeposition.

In forming a silicone-containing water-repellent film by any method except for electrodeposition, the nozzle hole and nozzle back surface are masked with photoresist or water-soluble resin and the resist is peeled off and removed after the formation of the silicone containing layer, thereby a silicone-containing water-repellent film can be formed only on the front surface of the nozzle plate.

However, in the present invention, the method of forming a silicone-containing water-repellent film is not limited thereto.

Generally, the thicker the silicone-containing water-repellent film, the better the mechanical durability. However, the ink discharging head has some restrictions; for example, an ink-repellent layer should be formed on a surface of a nozzle plate of the ink discharging head so that a nozzle hole can be made, therefore an ink-repellent coating should not be merely applied to the surface of the nozzle plate. In view of the restrictions, the thickness of the silicone-containing water-repellent film is preferably about 0.1 µm to about 5.0 µm, particularly preferably 0.5 µm to 2.0 µm in terms of the precise nozzle diameter.

The ink- and water-repellent film of the present invention is formed by curing a silicone-containing layer. Examples of a curing reaction of the silicone include a dehydration-condensation reaction between silanol groups, a condensation reaction between a silanol groups and a hydrolysable silyl group, a reaction by an organic peroxide between a methylsilyl group and a vinylsilyl group, and an addition reaction between a vinylsilyl group and a hydroxysilyl group. There reactions can proceed at room temperature or with heating. The curing reaction utilizing a photoreaction (ultraviolet reaction) of an acrylic group or epoxy group can be used. In the present invention, the curing reaction can be suitably selected depending on the use condition.

Among these, the condensation reaction between a silanol groups and a hydrolysable silyl group is particularly preferable. Examples of the hydrolysable silyl group include alkoxysilyl, oximesilyl, acetoxysilyl, aminoxysilyl, and propenoxysilyl. Among these, alkoxysilyl and oximesilyl are particularly preferable.

Raising the curing temperature is the most effective for increasing the degree of cure in the silicone-containing layer. However, too high curing temperature oxidizes the surface of the silicone-containing layer to thereby deteriorate the ink-repellency which is an essential function of the silicone-containing layer. Accordingly, high degree of cure needs to be compatible with high ink-repellency.

In order to solve the above-mentioned problem, a heat-curing under an inert atmosphere or in presence of an anti-oxidant can be used.

A silicone used in the forming of the silicone-containing water-repellent film is not particularly limited and may be appropriately selected depending on the intended purpose. Examples thereof include SR2411 and SR2410 (all manufactured by Dow Corning Toray Co., Ltd.) These are preferable in that they have ink-repellency needed for a nozzle plate as well as mechanical durability.

EXAMPLES

The present invention will be explained in more detail with reference to examples, but the present invention should not be limited thereto.

Preparation of Pigment Dispersion Liquid

Synthesis Example 1

Black Pigment Dispersion Liquid Partially Coated with Resin A

First, for preparation of a polymer solution, the inside of a 1 L flask equipped with a mechanical stirrer, a thermometer, a nitrogen gas inlet tube, a reflux tube, and a dripping funnel was sufficiently substituted with nitrogen gas. Then, 11.2 g of styrene, 2.8 g of acrylic acid, 12.0 g of lauryl methacrylate, 4.0 g of polyethylene glycol methacrylate, 4.0 g of styrene macromer (trade name: AS-6, manufactured by TOAGOSEI CO., LTD.) and 0.4 g of mercapto ethanol were put in the flask, and the temperature of the components was raised to 65° C. Next, a mixture solution of 100.8 g of styrene, 25.2 g of acrylic acid, 108.0 g of lauryl methacrylate, 36.0 g of polyethylene glycol methacrylate, 60.0 g of hydroxy ethyl methacrylate, 36.0 g of styrene macromer, 3.6 g of mercapto ethanol, 2.4 g of azobis dimethylvaleronitrile, and 18 g of methylethylketone was added dropwise into the flask for 2.5 hours.

After adding the mixture solution, another mixture solution of 0.8 g of azobis dimethylvaleronitrile and 18 g of methylethylketone was added dropwise into the flask for 0.5 hours. The mixture solution was aged at 65° C. for 1 hour, and then 0.8 g of azobis dimethylvaleronitrile was added thereto, and the mixture solution was further aged for 1 hour. Upon completion of the reaction, 364 g of methylethylketone was added into the flask to thereby obtain 800 g of a polymer solution with a concentration of 50% by mass. A part of the polymer solution was dried and measured by gel permeation chromatography (standard: polyethylene, solvent: tetrahydrofuran) and the molecular weight was determined as 15,000.

Then, 28 g of the obtained polymer solution, 26 g of carbon black, 13.6 g of 1 mol/L potassium hydroxide aqueous solution, 20 g of methylethylketone, and 30 g of ion exchange were sufficiently stirred. Thereafter, the mixture was kneaded 20 times using a three roll mill (trade name: NR-84A, manufactured by Noritake Co., Ltd). The obtained paste was put in 200 g of ion exchange water, sufficiently stirred, and then put in an evaporator to distil away methylethylketone and water therein to thereby obtain 160 g of black pigment dispersion liquid partially coated with the resin. Finally, this pigment dispersion liquid was filtered by a membrane filter having an average pore size of 0.8 µm to obtain [Black pigment dispersion liquid partially coated with resin A]. The number of coarse particles in 5 µL of the thus obtained pigment dispersion liquid was measured with ACCUSIZER 780 (manufactured by Particle Sizing Systems Inc.). The number of coarse particles having a particle diameter of 0.5 µm or more was determined as $1.3 \times 10^6$, and the number of coarse particles having a particle diameter of 1.0 µm or more was determined as $8.9 \times 10^3$. The amount of the resin contained in the carbon black partially coated with the resin was found to be 35% by mass.

Synthesis Example 2

Black Pigment Dispersion Liquid Partially Coated with Resin B

[Black pigment dispersion liquid partially coated with resin B] was obtained in the same manner as in Synthesis Example 1, except that the average pore size of the membrane filter used in filtration was changed to 1.2 µm.

The number of coarse particles in 5 µL of the thus obtained pigment dispersion liquid was measured with ACCUSIZER 780 (manufactured by Particle Sizing Systems Inc.). The number of coarse particles having a particle diameter of 0.5 µm or more was determined as $1.4 \times 10^6$, and the number of coarse particles having a particle diameter of 1.0 µm or more was determined as $1.3 \times 10^4$.

Synthesis Example 3

Black Pigment Dispersion Liquid Partially Coated with Resin C

[Black pigment dispersion liquid partially coated with resin C] was obtained in the same manner as in Synthesis Example 1, except that the average pore size of the membrane filter used in filtration was changed to 0.45 µm.

The number of coarse particles in 5 µL of the thus obtained pigment dispersion liquid was measured with ACCUSIZER 780 (manufactured by Particle Sizing Systems Inc.). The number of coarse particles having a particle diameter of 0.5 µm or more was determined as $1.8 \times 10^4$, and the number of coarse particles having a particle diameter of 1.0 µm or more was determined as $7.5 \times 10^2$.

Synthesis Example 4

Black Pigment Dispersion Liquid Partially Coated with Resin D

[Black pigment dispersion liquid partially coated with resin D] was obtained in the same manner as in Synthesis Example 1, except that the average pore size of the membrane filter used in filtration was changed to 0.22 µm.

The number of coarse particles in 5 µL of the thus obtained pigment dispersion liquid was measured with ACCUSIZER 780 (manufactured by Particle Sizing Systems Inc.). The number of coarse particles having a particle diameter of 0.5 µm or more was determined as $9.6 \times 10^3$, and the number of coarse particles having a particle diameter of 1.0 µm or more was determined as $1.3 \times 10^2$.

Synthesis Example 5

Black Pigment Dispersion Liquid Partially Coated with Resin E

[Black pigment dispersion liquid partially coated with resin E] was obtained in the same manner as in Synthesis Example 1, except that the average pore size of the membrane filter used in filtration was changed to 3.0 µm.

The number of coarse particles in 5 µL of the thus obtained pigment dispersion liquid was measured with ACCUSIZER 780 (manufactured by Particle Sizing Systems Inc.). The number of coarse particles having a particle diameter of 0.5 µm or more was determined as $2.8 \times 10^6$, and the number of coarse particles having a particle diameter of 1.0 µm or more was determined as $2.0 \times 10^4$.

Synthesis Example 6

Black Pigment Dispersion Liquid Partially Coated with Resin F

[Black pigment dispersion liquid partially coated with resin F] was obtained in the same manner as in Synthesis Example 1, except that the filtration through the membrane filter was not performed.

The number of coarse particles in 5 µL of the thus obtained pigment dispersion liquid was measured with ACCUSIZER 780 (manufactured by Particle Sizing Systems Inc.). The number of coarse particles having a particle diameter of 0.5 µm or more was determined as $3.6 \times 10^6$, and the number of coarse particles having a particle diameter of 1.0 µm or more was determined as $5.1 \times 10^4$.

Synthesis Example 7

[Black pigment dispersion liquid partially coated with resin G] was obtained in the same manner as in Synthesis Example 1, except that the amount of the polymer solution was changed from 28 g to 0.13 g.

The number of coarse particles in 5 µL of the thus obtained pigment dispersion liquid was measured with ACCUSIZER 780 (manufactured by Particle Sizing Systems Inc.). The number of coarse particles having a particle diameter of 0.5 µm or more was determined as $1.1 \times 10^6$, and the number of coarse particles having a particle diameter of 1.0 µm or more was determined as $7.8 \times 10^3$. The amount of the resin contained in the carbon black partially coated with the resin was found to be 0.5% by mass.

Synthesis Example 8

[Black pigment dispersion liquid partially coated with resin H] was obtained in the same manner as in Synthesis Example 1, except that the amount of the polymer solution was changed from 28 g to 0.53 g.

The number of coarse particles in 5 μL of the thus obtained pigment dispersion liquid was measured with ACCUSIZER 780 (manufactured by Particle Sizing Systems Inc.). The number of coarse particles having a particle diameter of 0.5 μm or more was determined as $1.2\times10^6$, and the number of coarse particles having a particle diameter of 1.0 μm or more was determined as $8.1\times10^3$. The amount of the resin contained in the carbon black partially coated with the resin was found to be 2.0% by mass.

Synthesis Example 9

[Black pigment dispersion liquid partially coated with resin I] was obtained in the same manner as in Synthesis Example 1, except that the amount of the polymer solution was changed from 28 g to 21.3 g.

The number of coarse particles in 5 μL of the thus obtained pigment dispersion liquid was measured with ACCUSIZER 780 (manufactured by Particle Sizing Systems Inc.). The number of coarse particles having a particle diameter of 0.5 μm or more was determined as $1.8\times10^6$, and the number of coarse particles having a particle diameter of 1.0 μm or more was determined as $9.9\times10^3$. The amount of the resin contained in the carbon black partially coated with the resin was found to be 45.0% by mass.

Synthesis Example 10

Black Pigment Dispersion Liquid Dispersed Using Surfactant

| | |
|---|---|
| Carbon black (NIPEX160, manufactured by Evonik Degussa Japan Co., Ltd., BET specific surface area: 150 m²/g, average primary particle diameter: 20 nm, pH: 4.0, DBP oil absorption 620 g/100 g) | 175 parts by mass |
| Sodium naphthalenesulfonate-formalin condensate (PIONIN A-45-PN, manufactured by Takemoto Oil & Fat Co., Ltd., total amount of a dimer, a trimer and a tetramer of naphthalene sulfonic acid: 50% by mass) | 175 parts by mass |
| Distilled water | 650 parts by mass |

The above-mentioned components were premixed to form Mixed slurry (a). The Mixed slurry (a) was dispersed while circulating by using a disk-type media mill (manufactured by Ashizawa Finetech Ltd., DMR type) with zirconia beads of 0.05 mm in diameter (filling rate: 55%) under the following conditions: peripheral speed: 10 m/s; liquid temperature: 10° C.; and dispersion time: 3 minutes, and then was subjected to centrifugal separation by a centrifugal separator (Model-7700, Kubota Corporation) so as to remove coarse particles, thereby obtaining [Black pigment dispersion liquid dispersed using surfactant]. The number of coarse particles in 5 μL of the thus obtained pigment dispersion liquid was measured with ACCUSIZER 780 (manufactured by Particle Sizing Systems Inc.). The number of coarse particles having a particle diameter of 0.5 μm or more was $1.6\times10^6$, and the number of coarse particles having a particle diameter of 1.0 μm or more was $2.3\times10^3$. Also, the liquid of the obtained pigment dispersion liquid was evaporated to measure the solid content. Then, it was confirmed that the concentration of the pigment was 16.3% by mass as calculated from the amount of the pigment used.

Example 1

The following components were mixed and stirred for 1 hour to obtain a homogeneous mixture.

| | |
|---|---|
| Antifouling agent (polyester-modified silicone oil, KF-353, manufactured by Sin-Etsu Chemical Co., Ltd.) | 0.05 parts by mass |
| Surfactant (ZONYL FS-300, manufactured by Du Pont Kabushiki Kaisha, polyoxyalkylene perfluoroalkyl ether: 40% by mass) | 1.0 part by mass |
| 3-methyl-1,3-butanediol | 20 parts by mass |
| 2-pyrrolidone | 2.0 parts by mass |
| Glycerin | 8.0 parts by mass |
| Penetrating agent (2-ethyl-1,3-hexanediol) | 2.0 parts by mass |
| Preservative (PROXEL GXL: antifungal agent containing as main component 20% by mass of 1,2-benzisothiazolin-3-one in dipropylene glycol, manufactured by Avecia Ltd.) | 0.05 parts by mass |
| Pure water | balance |

To the mixture, the following components were added, stirred for 1 hour, and then subjected to filtration under pressure through a polyvinylidene fluoride membrane filter having the average pore diameter of 5.0 μm so as to remove coarse particles and contaminants, thereby obtaining [Ink 1] of Example 1.

| | |
|---|---|
| [Black pigment dispersion liquid partially coated with resin A] | 25 parts by mass |
| [Black pigment dispersion liquid dispersed using surfactant] | 25 parts by mass |
| pH controlling agent (2-amino-2-ethyl-1,3-propanediol) | 1.0 part by mass |

Example 2

[Ink 2] was obtained in the same manner as in Example 1, except that [Black pigment dispersion liquid dispersed using surfactant] was changed to a self-dispersing pigment dispersion liquid (trade name: KM-9036, manufactured by TOYO INK CO., LTD.).

The number of coarse particles in 5 μL of the pigment dispersion liquid (manufactured by TOYO INK CO., LTD.) was measured with ACCUSIZER 780 (manufactured by Particle Sizing Systems Inc.). The number of coarse particles having a particle diameter of 0.5 μm or more was determined as $7.2\times10^5$, and the number of coarse particles having a particle diameter of 1.0 μm or more was determined as $2.4\times10^3$.

Example 3

[Ink 3] was obtained in the same manner as in Example 1, except that 25 parts by mass of [Black pigment dispersion liquid partially coated with resin A] was changed to 25 parts by mass of [Black pigment dispersion liquid partially coated with resin B].

Example 4

[Ink 4] was obtained in the same manner as in Example 1, except that the amount of [Black pigment dispersion liquid partially coated with resin A] was changed to 50 parts by mass, and [Black pigment dispersion liquid dispersed using surfactant] was not added.

Example 5

[Ink 5] was obtained in the same manner as in Example 4, except that [Black pigment dispersion liquid partially coated with resin A] was changed to [Black pigment dispersion liquid partially coated with resin G].

Example 6

[Ink 6] was obtained in the same manner as in Example 4, except that [Black pigment dispersion liquid partially coated with resin A] was changed to [Black pigment dispersion liquid partially coated with resin H].

Example 7

[Ink 7] was obtained in the same manner as in Example 4, except that [Black pigment dispersion liquid partially coated with resin A] was changed to [Black pigment dispersion liquid partially coated with resin I].

Example 8

[Ink 8] was obtained in the same manner as in Example 1, except that the amount of the antifouling agent was changed from 0.05 parts by mass to 3.5 parts by mass.

Example 9

[Ink 9] was obtained in the same manner as in Example 1, except that the amount of the antifouling agent was changed from 0.05 parts by mass to 2.5 parts by mass.

Example 10

[Ink 10] was obtained in the same manner as in Example 1, except that the amount of the antifouling agent was changed from 0.05 parts by mass to 0.008 parts by mass.

Example 11

[Ink 11] was obtained in the same manner as in Example 1, except that the amount of the antifouling agent was changed from 0.05 parts by mass to 0.02 parts by mass.

Example 12

[Ink 12] was obtained in the same manner as in Example 1, except that the antifouling agent was not added.

Example 13

[Ink 13] was obtained in the same manner as in Example 1, except that the amount of [Black pigment dispersion liquid partially coated with resin A] was changed to 15 parts by mass, and the amount of [Black pigment dispersion liquid dispersed using surfactant] was changed to 35 parts by mass.

Example 14

[Ink 14] was obtained in the same manner as in Example 1, except that the amount of [Black pigment dispersion liquid partially coated with resin A] was changed to 20 parts by mass, and the amount of [Black pigment dispersion liquid dispersed using surfactant] was changed to 30 parts by mass.

Example 15

[Ink 15] was obtained in the same manner as in Example 1, except that the amount of [Black pigment dispersion liquid partially coated with resin A] was changed to 45 parts by mass, and the amount of [Black pigment dispersion liquid dispersed using surfactant] was changed to 5 parts by mass.

Example 16

[Ink 16] was obtained in the same manner as in Example 1, except that 25 parts by mass of [Black pigment dispersion liquid partially coated with resin A] was changed to 50 parts by mass of [Black pigment dispersion liquid partially coated with resin C], and [Black pigment dispersion liquid dispersed using surfactant] was not added.

Example 17

[Ink 17] was obtained in the same manner as in Example 1, except that 25 parts by mass of [Black pigment dispersion liquid partially coated with resin A] was changed to 50 parts by mass of [Black pigment dispersion liquid partially coated with resin E], and [Black pigment dispersion liquid dispersed using surfactant] was not added.

Comparative Example 1

[Ink a] was obtained in the same manner as in Example 1, except that 25 parts by mass of [Black pigment dispersion liquid partially coated with resin A] was changed to 50 parts by mass of [Black pigment dispersion liquid partially coated with resin D], and [Black pigment dispersion liquid dispersed using surfactant] was not added.

Comparative Example 2

[Ink b] was obtained in the same manner as in Example 1, except that 25 parts by mass of [Black pigment dispersion liquid partially coated with resin A] was changed to 50 parts by mass of [Black pigment dispersion liquid partially coated with resin F], and [Black pigment dispersion liquid dispersed using surfactant] was not added.

Comparative Example 3

[Ink c] was obtained in the same manner as in Example 1, except that [Black pigment dispersion liquid partially coated with resin A] was not added, and the amount of [Black pigment dispersion liquid dispersed using surfactant] was changed to 50 parts by mass.

Comparative Example 4

[Ink d] was obtained in the same manner as in Example 1, except that the amount of [Black pigment dispersion liquid partially coated with resin A] was changed to 5.0 parts by mass, and the amount of [Black pigment dispersion liquid dispersed using surfactant] was changed to 45 parts by mass.

Comparative Example 5

[Ink e] was obtained in the same manner as in Example 1, except that the water soluble organic solvent or the wetting agent was not added.

The compositions of [Ink 1] to [Ink 17] and [Ink a] to [Ink e] are shown in Tables 1-1, 1-2 and 1-3.

TABLE 1-1

|  | Component (% by mass) | Ink 1 | Ink 2 | Ink 3 | Ink 4 | Ink 5 | Ink 6 | Ink 7 | Ink 8 |
|---|---|---|---|---|---|---|---|---|---|
| Pigment Dispersion | "BPDL" A (Syn. Ex. 1) | 25.0 | 25.0 |  | 50.0 |  |  |  | 25.0 |
|  | "BPDL" B (Syn. Ex. 2) |  |  | 25.0 |  |  |  |  |  |
|  | "BPDL" C (Syn. Ex. 3) |  |  |  |  |  |  |  |  |
|  | "BPDL" D (Syn. Ex. 4) |  |  |  |  |  |  |  |  |
|  | "BPDL" E (Syn. Ex. 5) |  |  |  |  |  |  |  |  |
|  | "BPDL" F (Syn. Ex. 6) |  |  |  |  |  |  |  |  |
|  | "BPDL" G (Syn. Ex. 7) |  |  |  |  | 50.0 |  |  |  |
|  | "BPDL" H (Syn. Ex. 8) |  |  |  |  |  | 50.0 |  |  |
|  | "BPDL" I (Syn. Ex. 9) |  |  |  |  |  |  | 50.0 |  |
|  | "BPDLDUS" (Syn. Ex. 10) | 25.0 |  | 25.0 |  |  |  |  | 25.0 |
|  | Black self-dispersing pigment dispersion liquid KM-9036 *1 |  | 25.0 |  |  |  |  |  |  |
| Antifouling agent | KF-353 *2 | 0.05 | 0.05 | 0.05 | 0.05 | 0.05 | 0.05 | 0.05 | 5.5 |
| Surfactant | ZONYL FS-300 *3 | 1.0 | 1.0 | 1.0 | 1.0 | 1.0 | 1.0 | 1.0 | 1.0 |
| Water-soluble solvent | 3-methyl-1,3-butanediol | 20.0 | 20.0 | 20.0 | 20.0 | 20.0 | 20.0 | 20.0 | 20.0 |
|  | 2-pyrrolidone | 2.0 | 2.0 | 2.0 | 2.0 | 2.0 | 2.0 | 2.0 | 2.0 |
|  | Glycerin | 8.0 | 8.0 | 8.0 | 8.0 | 8.0 | 8.0 | 8.0 | 8.0 |
| Penetrating agent | 2-ethyl-1,3-hexanediol | 2.0 | 2.0 | 2.0 | 2.0 | 2.0 | 2.0 | 2.0 | 2.0 |
| Preservative | PROXEL GXL *4 | 0.05 | 0.05 | 0.05 | 0.05 | 0.05 | 0.05 | 0.05 | 0.05 |
| pH control agent | 2-amino-2-ethyl-1,3-propanediol | 1.0 | 1.0 | 1.0 | 1.0 | 1.0 | 1.0 | 1.0 | 1.0 |
|  | Pure water | balance | balance | balance | balance | balance | balance | balance | balance |

In Table 1-1, "BPDL" means "Black pigment dispersion liquid partially coated with resin" and "BPDLDUS" means "Black pigment dispersion liquid dispersed using surfactant."

TABLE 1-2

|  | Component (% by mass) | Ink 9 | Ink 10 | Ink 11 | Ink 12 | Ink 13 | Ink 14 | Ink 15 | Ink 16 |
|---|---|---|---|---|---|---|---|---|---|
| Pigment Dispersion | "BPDL" A (Syn. Ex. 1) | 25.0 | 25.0 | 25.0 | 25.0 | 15.0 | 20.0 | 45.0 |  |
|  | "BPDL" B (Syn. Ex. 2) |  |  |  |  |  |  |  |  |
|  | "BPDL" C (Syn. Ex. 3) |  |  |  |  |  |  |  | 50.0 |
|  | "BPDL" D (Syn. Ex. 4) |  |  |  |  |  |  |  |  |
|  | "BPDL" E (Syn. Ex. 5) |  |  |  |  |  |  |  |  |
|  | "BPDL" F (Syn. Ex. 6) |  |  |  |  |  |  |  |  |
|  | "BPDL" G (Syn. Ex. 7) |  |  |  |  |  |  |  |  |
|  | "BPDL" H (Syn. Ex. 8) |  |  |  |  |  |  |  |  |
|  | "BPDL" I (Syn. Ex. 9) |  |  |  |  |  |  |  |  |
|  | "BPDLDUS" (Syn. Ex. 10) | 25.0 | 25.0 | 25.0 | 25.0 | 35.0 | 30.0 | 5.0 |  |
|  | Black self-dispersing pigment dispersion liquid KM-9036 *1 |  |  |  |  |  |  |  |  |
| Antifouling agent | KF-353 *2 | 4.5 | 0.008 | 0.02 |  | 0.05 | 0.05 | 0.05 | 0.05 |
| Surfactant | ZONYL FS-300 *3 | 1.0 | 1.0 | 1.0 | 1.0 | 1.0 | 1.0 | 1.0 | 1.0 |
| Water-soluble solvent | 3-methyl-1,3-butanediol | 20.0 | 20.0 | 20.0 | 20.0 | 20.0 | 20.0 | 20.0 | 20.0 |
|  | 2-pyrrolidone | 2.0 | 2.0 | 2.0 | 2.0 | 2.0 | 2.0 | 2.0 | 2.0 |
|  | Glycerin | 8.0 | 8.0 | 8.0 | 8.0 | 8.0 | 8.0 | 8.0 | 8.0 |
| Penetrating agent | 2-ethyl-1,3-hexanediol | 2.0 | 2.0 | 2.0 | 2.0 | 2.0 | 2.0 | 2.0 | 2.0 |
| Preservative | PROXEL GXL *4 | 0.05 | 0.05 | 0.05 | 0.05 | 0.05 | 0.05 | 0.05 | 0.05 |
| pH control agent | 2-amino-2-ethyl-1,3-propanediol | 1.0 | 1.0 | 1.0 | 1.0 | 1.0 | 1.0 | 1.0 | 1.0 |
|  | Pure water | balance | balance | balance | balance | balance | balance | balance | balance |

In Table 1-2, "BPDL" means "Black pigment dispersion liquid partially coated with resin" and "BPDLDUS" means "Black pigment dispersion liquid dispersed using surfactant."

TABLE 1-3

|  | Component (% by mass) | Ink 17 | Ink a | Ink b | Ink c | Ink d | Ink e |
|---|---|---|---|---|---|---|---|
| Pigment Dispersion | "BPDL" A (Syn. Ex. 1) |  |  |  |  | 5.0 | 25.0 |
|  | "BPDL" B (Syn. Ex. 2) |  |  |  |  |  |  |
|  | "BPDL" C (Syn. Ex. 3) |  |  |  |  |  |  |
|  | "BPDL" D (Syn. Ex. 4) |  | 50.0 |  |  |  |  |
|  | "BPDL" E (Syn. Ex. 5) | 50.0 |  |  |  |  |  |
|  | "BPDL" F (Syn. Ex. 6) |  |  | 50.0 |  |  |  |
|  | "BPDL" G (Syn. Ex. 7) |  |  |  |  |  |  |
|  | "BPDL" H (Syn. Ex. 8) |  |  |  |  |  |  |
|  | "BPDL" I (Syn. Ex. 9) |  |  |  |  |  |  |
|  | "BPDLDUS" (Syn. Ex. 10) |  |  |  | 50.0 | 45.0 | 25.0 |
|  | Black self-dispersing pigment dispersion liquid KM-9036 *1 |  |  |  |  |  |  |
| Antifouling agent | KF-353 *2 | 0.05 | 0.05 | 0.05 | 0.05 | 0.05 | 0.05 |
| Surfactant | ZONYL FS-300 *3 | 1.0 | 1.0 | 1.0 | 1.0 | 1.0 | 1.0 |

TABLE 1-3-continued

| | Component (% by mass) | Ink 17 | Ink a | Ink b | Ink c | Ink d | Ink e |
|---|---|---|---|---|---|---|---|
| Water-soluble solvent | 3-methyl-1,3-butanediol | 20.0 | 20.0 | 20.0 | 20.0 | 20.0 | 0.0 |
| | 2-pyrrolidone | 2.0 | 2.0 | 2.0 | 2.0 | 2.0 | 0.0 |
| | Glycerin | 8.0 | 8.0 | 8.0 | 8.0 | 8.0 | 0.0 |
| Penetrating agent | 2-ethyl-1,3-hexanediol | 2.0 | 2.0 | 2.0 | 2.0 | 2.0 | 0.0 |
| Preservative | PROXEL GXL *4 | 0.05 | 0.05 | 0.05 | 0.05 | 0.05 | 0.05 |
| pH control agent | 2-amino-2-ethyl-1,3-propanediol | 1.0 | 1.0 | 1.0 | 1.0 | 1.0 | 1.0 |
| | Pure water | balance | balance | balance | balance | balance | balance |

In Table 1-3, "BPDL" means "Black pigment dispersion liquid partially coated with resin" and "BPDLDUS" means "Black pigment dispersion liquid dispersed using surfactant."

In Tables 1-1, 1-2 and 1-3, additional information of the products with *1, *2, *3 and *4 is as follows.

*1 The number of coarse particles in 5 µL of the pigment dispersion liquid (manufactured by TOYO INK CO., LTD.) was measured with ACCUSIZER 780 (manufactured by Particle Sizing Systems Inc.). The number of coarse particles having a particle diameter of 0.5 µm or more was determined as $7.2 \times 10^5$, and the number of coarse particles having a particle diameter of 1.0 µm or more was determined as $2.4 \times 10^3$.

*2 polyester-modified silicone oil, manufactured by Sin-Etsu Chemical Co., Ltd.

*3 ZONYL FS-300: containing 40% by mass of polyoxyalkylene perfluoroalkyl ether, manufactured by Du Pont Kabushiki Kaisha

*4 PROXEL GXL: antifungal agent containing as main component 20% by mass of 1,2-benzisothiazolin-3-one in dipropylene glycol, manufactured by Avecia Ltd.

<Evaluation of Ink>

Each of ink prepared in Examples 1 to 17 and Comparative Examples 1 to 5 were evaluated for storability and the number of coarse particles according to the following methods.

<Measurement of Number of Coarse Particles in Pigment Dispersion Liquid and Ink>

The numbers of coarse particles having a particle diameter of 0.5 µm or more and 1.0 µm or more in 5 µL of each of the dispersions and inks were measured with ACCUSIZER 780 (manufactured by Particle Sizing Systems Inc.)

<Evaluation of Ink Storability>

Ink storability was evaluated as follows: the viscosity of each of the inks was measured immediately after preparing, and then each ink was put into a polyethylene container, tightly sealed, and stored for 2 weeks at a temperature of 70° C. After storage, the viscosity of each of the inks was measured again and evaluation was made according to the rate of change from the initial viscosity.

(Evaluation Criteria)

A: Viscosity changed less than 5% after the storage relative to the initial viscosity B: Viscosity changed 5% or more but less than 50% after the storage relative to the initial viscosity C: Viscosity changed more than 50% after the storage relative to the initial viscosity The viscosity of each of the inks was measured with RE80L-type viscometer (manufactured by TOKI SANGYO CO., LTD.) at 25° C. with the rotation speed of 50 rpm.

The results are shown in Table 2.

TABLE 2

| | | Number of coarse particles [per 5 µL] | | | |
|---|---|---|---|---|---|
| | Storability | 0.5 µm or more (=N) | 1.0 µm or more | R [wt %] | N × R/100 |
| Ink 1 | A | $1.2 \times 10^6$ | $5.4 \times 10^3$ | 50.0 | $6.1 \times 10^5$ |
| Ink 2 | A | $7.8 \times 10^5$ | $2.0 \times 10^3$ | 50.0 | $3.9 \times 10^5$ |
| Ink 3 | A | $1.4 \times 10^6$ | $1.1 \times 10^4$ | 50.0 | $7.0 \times 10^5$ |
| Ink 4 | A | $9.0 \times 10^5$ | $6.4 \times 10^3$ | 100.0 | $9.0 \times 10^5$ |
| Ink 5 | B | $8.1 \times 10^5$ | $5.8 \times 10^3$ | 100.0 | $8.1 \times 10^5$ |
| Ink 6 | A | $8.5 \times 10^5$ | $6.0 \times 10^3$ | 100.0 | $8.5 \times 10^5$ |
| Ink 7 | A | $9.3 \times 10^5$ | $7.2 \times 10^3$ | 100.0 | $9.3 \times 10^5$ |
| Ink 8 | B | $1.2 \times 10^6$ | $9.2 \times 10^3$ | 50.0 | $6.1 \times 10^5$ |
| Ink 9 | B | $1.2 \times 10^6$ | $9.2 \times 10^3$ | 50.0 | $6.1 \times 10^5$ |
| Ink 10 | A | $1.1 \times 10^6$ | $9.1 \times 10^3$ | 50.0 | $5.7 \times 10^5$ |
| Ink 11 | A | $1.1 \times 10^6$ | $8.9 \times 10^3$ | 50.0 | $5.7 \times 10^5$ |
| Ink 12 | A | $1.1 \times 10^6$ | $8.5 \times 10^3$ | 50.0 | $5.7 \times 10^5$ |
| Ink 13 | A | $1.4 \times 10^6$ | $9.2 \times 10^3$ | 30.0 | $4.3 \times 10^5$ |
| Ink 14 | A | $1.3 \times 10^6$ | $7.8 \times 10^3$ | 40.0 | $5.3 \times 10^5$ |
| Ink 15 | A | $9.5 \times 10^5$ | $7.0 \times 10^3$ | 90.0 | $8.5 \times 10^5$ |
| Ink 16 | A | $1.1 \times 10^4$ | $2.1 \times 10^4$ | 100.0 | $1.1 \times 10^4$ |
| Ink 17 | B | $9.8 \times 10^5$ | $1.5 \times 10^4$ | 100.0 | $9.8 \times 10^5$ |
| Ink a | A | $9.2 \times 10^3$ | $9.9 \times 10^2$ | 100.0 | $9.2 \times 10^3$ |
| Ink b | C | $1.2 \times 10^6$ | $2.1 \times 10^4$ | 100.0 | $1.2 \times 10^6$ |
| Ink c | C | $1.3 \times 10^6$ | $1.9 \times 10^3$ | 0.0 | 0.0 |
| Ink d | B | $1.3 \times 10^6$ | $1.8 \times 10^3$ | 10.0 | $1.3 \times 10^5$ |
| Ink e | A | $1.2 \times 10^6$ | $5.4 \times 10^3$ | 50.0 | $6.1 \times 10^5$ |

(Forming of Ink Discharging Head)

The silicone-containing layer having the thickness of about 1.0 µm was formed on the Ni-electroformed nozzle surface by applying the silicone resin (SR 2411, in which an oximesilyl group is used as a hydrolysable silyl group is, manufactured by Dow Corning Toray Co., Ltd.) with a spraying method. In this process, a nozzle hole and nozzle back surface were masked with water-soluble resin and the resin was peeled off and removed after the formation of the silicone containing layer. Thus obtained silicone-containing layer was subjected to heat-curing at 260° C. for 30 minutes to thereby form an ink discharging head coated with an ink-repellent layer.

<Printing Evaluation>

[Ink 1] to [Ink 17] and [Ink a] to [Ink e] were evaluated according to the following method using the inkjet recording apparatus including a head which is provided with a nozzle plate applied with a silicone-containing water-repellent layer shown in FIG. 1.

In addition, for [Ink 1], the inkjet recording apparatus including a head which is provided with a nozzle having a Ni-plated film formed with an electroforming method, and the inkjet recording apparatus including a head which is provided with a nozzle having no water-repellent film also were evaluated in the same manner.

Under the environment controlled at the temperature of 24±0.5° C. and humidity of 50±5%, using the inkjet printer (IPSIO GX3000, manufactured by Ricoh Co., Ltd.), the printer was set up to apply the same amount of the ink onto the recording medium by changing the driving voltage of the piezoelectric element so that the amount of the discharged ink was made uniform.

Each evaluation item and evaluation method thereof is shown as follows.

(Discharge Stability)

The inkjet printer was filled with each of [Ink 1] to [Ink 17] and [Ink a] to [Ink e]. A chart pattern of solids and lines was continuously printed on 100 sheets of MY PAPER (manufactured by Ricoh Company, Ltd.; woodfree paper; basis weight: 69.6 g/m$^2$; sizing: 23.2 sec; air permeability: 21 sec.). When ink dot missing or ink droplet trajectory directionality problem occurred during the printing, the printer nozzle was cleaned in order to restore the printing quality to normal condition. The total number of the cleaning operation was counted. Discharge stabilities of each ink were evaluated from the thus obtained total number according to the following criteria.

[Evaluation Criteria]
 A: No cleaning operation
 B: One cleaning operation
 C: Two or more but less than five cleaning operations
 D: Five or more cleaning operations (Wiping Durability=Cleanability)

The inkjet printer was filled with each of [Ink 1] to [Ink 17] and [Ink a] to [Ink e]. A nozzle check pattern was printed on MY PAPER to confirm the absence of problems related to the head. Then, the cleaning operation of the printer nozzle including wiping the head thereof was continuously performed 50 times. After completion of the cleaning operation, the nozzle check pattern was printed on MY PAPER (manufactured by Ricoh Company, Ltd.; woodfree paper; basis weight: 69.6 g/m$^2$; sizing: 23.2 sec; air permeability: 21.0 sec) again. The total number of nozzles which resulted in the event of ink dot missing or ink droplet trajectory directionality problem was counted, and wiping durability of each ink were evaluated from the thus obtained total number according to the following criteria.

[Evaluation Criteria]
 A: No nozzle resulted in the event of ink dot missing or ink droplet trajectory directionality problem.
 B: One or more but less than three nozzles resulted in the event of ink dot missing or ink droplet trajectory directionality problems.
 C: Three or more nozzles resulted in the event of ink dot missing or ink droplet trajectory directionality problems.

<Image Density (OD Value)>

The inkjet printer was filled with each of [Ink 1] to [Ink 17] and [Ink a] to [Ink e]. A chart on which a 64 point symbol "■" made by Microsoft Word 2003 had been written was printed out by My Paper, the color of the symbol "■" part on the printing surface was measured using X-Rite 938, and evaluated by the following evaluation criteria. The print mode was set to "Plain Paper-High Speed" mode by using a driver attached to a printer.

[Evaluation Criteria]
 A: OD value: Black 1.20 or more
 B: OD value: Black 1.10 or more but less than 1.20
 C: OD value: Black 1.00 or more but less than 1.10
 D: OD value: Black less than 1.00

Results of the evaluation are shown in Table 3.

TABLE 3

|   | Ink No. | Type of water-repellent film | Image density | Wiping durability | Discharge stability |
|---|---|---|---|---|---|
| Ex. 1 | Ink 1 | silicone-containing water-repellent film | A | A | A |
| Ex. 2 | Ink 2 | silicone-containing water-repellent film | B | A | A |
| Ex. 3 | Ink 3 | silicone-containing water-repellent film | A | B | A |
| Ex. 4 | Ink 4 | silicone-containing water-repellent film | A | B | A |
| Ex. 5 | Ink 5 | silicone-containing water-repellent film | A | B | B |
| Ex. 6 | Ink 6 | silicone-containing water-repellent film | A | B | A |
| Ex. 7 | Ink 7 | silicone-containing water-repellent film | B | A | B |
| Ex. 8 | Ink 8 | silicone-containing water-repellent film | A | A | B |
| Ex. 9 | Ink 9 | silicone-containing water-repellent film | A | A | A |
| Ex. 10 | Ink 10 | silicone-containing water-repellent film | A | B | A |
| Ex. 11 | Ink 11 | silicone-containing water-repellent film | A | A | A |
| Ex. 12 | Ink 12 | silicone-containing water-repellent film | A | B | A |
| Ex. 13 | Ink 13 | silicone-containing water-repellent film | B | A | A |
| Ex. 14 | Ink 14 | silicone-containing water-repellent film | A | A | A |
| Ex. 15 | Ink 15 | silicone-containing water-repellent film | A | A | A |
| Ex. 16 | Ink 16 | silicone-containing water-repellent film | B | A | A |
| Ex. 17 | Ink 17 | silicone-containing water-repellent film | A | B | B |
| Comp. Ex. 1 | Ink a | silicone-containing water-repellent film | D | A | A |
| Comp. Ex. 2 | Ink b | silicone-containing water-repellent film | B | C | D |
| Comp. Ex. 3 | Ink c | silicone-containing water-repellent film | D | A | A |
| Comp. Ex. 4 | Ink d | silicone-containing water-repellent film | C | A | A |
| Comp. Ex. 5 | Ink 1 | Ni-plated film | A | C | B |
| Comp. Ex. 6 | Ink 1 | No water-repellent film | B | C | D |
| Comp. Ex. 7 | Ink e | silicone-containing water-repellent film | B | B | D |

Aspects of the present invention are as follows:

<1> An inkjet recording apparatus including:
 an ink; and
 an ink discharging head configured to discharge the ink,
 wherein the ink discharging head is provided with a nozzle having a silicone-containing water-repellent film on a surface thereof on which the ink contacts,
 wherein the ink contains:
 a colorant;
 water; and
 a water soluble organic solvent,
 wherein the colorant contains a carbon black partially coated with a resin, and
 wherein the ink meets the following expressions (1) and (2):

$$1.0 \times 10^4 < N \times R/100 < 1.0 \times 10^6 \tag{1}$$

$$20.0 < R \leq 100.0 \tag{2}$$

where R (% by mass) denotes a rate of the mass of the carbon black partially coated with a resin relative to the mass of the colorant, and N denotes the number of coarse particles having a particle diameter of 0.5 μm or more per 5 μL of the ink where the number thereof is determined with a number counting method.

<2> The inkjet recording apparatus according to <1>, wherein an amount of the resin contained in the carbon black partially coated with the resin is 1% by mass to 40% by mass.

<3> The inkjet recording apparatus according to <1> or <2>, wherein the ink further contains 0.01% by mass to 5% by mass of a polyether-modified silicone compound represented by the following General Formula (1):

General Formula 1

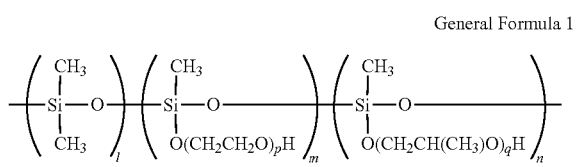

where l, m, n, p, and q each independently denote a natural number; and meet the following expressions: l+m+n<2,000 and p+q<100.

<4> The inkjet recording apparatus according to any one of <1> to <3>, wherein the number of coarse particles having a particle diameter of 1.0 μm or more per 5 μL of the ink where the number thereof is determined with a number counting method is less than $1.0 \times 10^4$.

<5> The inkjet recording apparatus according to any one of <1> to <4>, wherein the R (% by mass) is 35.0<R<95.0.

<6> An ink including:
a colorant;
water; and
a water soluble organic solvent,
wherein the colorant contains a carbon black partially coated with a resin,
wherein the ink meets the following expressions (1) and (2):

$$1.0 \times 10^4 < N \times R/100 < 1.0 \times 10^6 \quad (1)$$

$$20.0 < R \leq 100.0 \quad (2)$$

where R (% by mass) denotes a rate of the mass of the carbon black partially coated with a resin relative to the mass of the colorant, and N denotes the number of coarse particles having a particle diameter of 0.5 μm or more per 5 μL of the ink where the number thereof is determined with a number counting method, and
wherein the ink is used for the inkjet recording apparatus according to any one of <1> to <5>.

<7> A method for inkjet recording including:
recording an image using an ink and an ink discharging head configured to discharge the ink,
wherein the ink discharging head is provided with a nozzle plate having a silicone-containing water-repellent film on a surface thereof on which the ink contacts,
wherein the ink contains:
a colorant;
water; and
a water soluble organic solvent,
wherein the colorant contains a carbon black partially coated with a resin,
wherein the ink meets the following expressions (1) and (2):

$$1.0 \times 10^4 < N \times R/100 < 1.0 \times 10^6 \quad (1)$$

$$20.0 < R \leq 100.0 \quad (2)$$

where R (% by mass) denotes a rate of the mass of the carbon black partially coated with a resin relative to the mass of the colorant, and N denotes the number of coarse particles having a particle diameter of 0.5 μm or more per 5 μL of the ink where the number thereof is determined with a number counting method.

This application claims priority to Japanese application No. 2011-195728, filed on Sep. 8, 2011, and incorporated herein by reference.

What is claimed is:

1. An inkjet recording apparatus comprising:
an ink; and
an ink discharging head configured to discharge the ink,
wherein the ink discharging head is provided with a nozzle having a silicone-containing water-repellent film on a surface thereof on which the ink contacts,
wherein the ink contains:
a colorant;
water; and
a water soluble organic solvent,
wherein the colorant contains a carbon black partially coated with a resin, and
wherein the ink meets the following expressions (1) and (2):

$$1.0 \times 10^4 < N \times R/100 < 1.0 \times 10^6 \quad (1)$$

$$20.0 < R \leq 100.0 \quad (2)$$

where R (% by mass) denotes a rate of the mass of the carbon black partially coated with a resin relative to the mass of the colorant, and N denotes the number of coarse particles having a particle diameter of 0.5 μm or more per 5 μL of the ink where the number thereof is determined with a number counting method,
and further wherein at least one of the following apply:
an amount of the resin contained in the carbon black partially coated with the resin is 1% by mass to 40% by mass, and
the R (% by mass) is 35.0<R<95.0.

2. The inkjet recording apparatus according to claim 1, wherein an amount of the resin contained in the carbon black partially coated with the resin is 1% by mass to 40% by mass.

3. The inkjet recording apparatus according to claim 2, wherein the R (% by mass) is 35.0<R<95.0.

4. The inkjet recording apparatus according to claim 1, wherein the ink further contains 0.01% by mass to 5% by mass of a polyether-modified silicone compound represented by the following General Formula (1):

General Formula 1

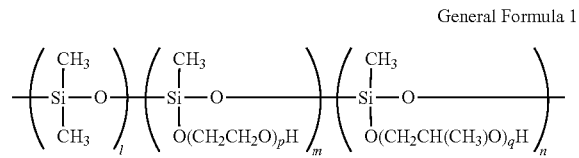

where l, m, n, p, and q each independently denote a natural number; and meet the following expressions: l+m+n<2,000 and p+q<100.

5. The inkjet recording apparatus according to claim 4, wherein an amount of the resin contained in the carbon black partially coated with the resin is 1% by mass to 40% by mass.

6. The inkjet recording apparatus according to claim 4, wherein the R (% by mass) is 35.0<R<95.0.

7. The inkjet recording apparatus according to claim 1, wherein the number of coarse particles having a particle diameter of 1.0 μm or more per 5 μL of the ink where the number thereof is determined with a number counting method is less than $1.0 \times 10^4$.

8. The inkjet recording apparatus according to claim 7, wherein an amount of the resin contained in the carbon black partially coated with the resin is 1% by mass to 40% by mass.

9. The inkjet recording apparatus according to claim 7, wherein the R (% by mass) is 35.0<R<95.0.

10. The inkjet recording apparatus according to claim 1, wherein the R (% by mass) is 35.0<R<95.0.

11. The inkjet recording apparatus according to claim 10, wherein an amount of the resin contained in the carbon black partially coated with the resin is 1% by mass to 40% by mass.

12. An ink comprising:
a colorant;
water; and
a water soluble organic solvent,
wherein the colorant contains a carbon black partially coated with a resin,
wherein the ink meets the following expressions (1) and (2):

$$1.0 \times 10^4 < N \times R/100 < 1.0 \times 10^6 \qquad (1)$$

$$20.0 < R \leq 100.0 \qquad (2)$$

where R (% by mass) denotes a rate of the mass of the carbon black partially coated with a resin relative to the mass of the colorant, and N denotes the number of coarse particles having a particle diameter of 0.5 μm or more per 5 μL of the ink where the number thereof is determined with a number counting method,
wherein the ink is used for an inkjet recording apparatus including an ink discharging head which is provided with a nozzle having a silicone-containing water-repellent film on a surface thereof on which the ink contacts,
and further wherein at least one of the following apply:
an amount of the resin contained in the carbon black partially coated with the resin is 1% by mass to 40% by mass, and
the R (% by mass) is 35.0<R<95.0.

13. The inkjet recording apparatus according to claim 12, wherein an amount of the resin contained in the carbon black partially coated with the resin is 1% by mass to 40% by mass.

14. The inkjet recording apparatus according to claim 12, wherein the R (% by mass) is 35.0<R<95.0.

15. A method for inkjet recording comprising:
recording an image using an ink and an ink discharging head configured to discharge the ink,
wherein the ink discharging head is provided with a nozzle plate having a silicone-containing water-repellent film on a surface thereof on which the ink contacts,
wherein the ink contains:
a colorant;
water; and
a water soluble organic solvent,
wherein the colorant contains a carbon black partially coated with a resin,
wherein the ink meets the following expressions (1) and (2):

$$1.0 \times 10^4 < N \times R/100 < 1.0 \times 10^6 \qquad (1)$$

$$20.0 < R \leq 100.0 \qquad (2)$$

where R (% by mass) denotes a rate of the mass of the carbon black partially coated with a resin relative to the mass of the colorant, and N denotes the number of coarse particles having a particle diameter of 0.5 μm or more per 5 μL of the ink where the number thereof is determined with a number counting method,
and further wherein at least one of the following apply:
an amount of the resin contained in the carbon black partially coated with the resin is 1% by mass to 40% by mass, and
the R (% by mass) is 35.0<R<95.0.

16. The inkjet recording apparatus according to claim 15, wherein an amount of the resin contained in the carbon black partially coated with the resin is 1% by mass to 40% by mass.

17. The inkjet recording apparatus according to claim 15, the R (% by mass) is 35.0<R<95.0.

* * * * *